(12) United States Patent
Todorokihara et al.

(10) Patent No.: US 11,808,572 B2
(45) Date of Patent: Nov. 7, 2023

(54) VIBRATION RECTIFICATION ERROR CORRECTION CIRCUIT, PHYSICAL QUANTITY SENSOR MODULE, STRUCTURE MONITORING DEVICE, AND CORRECTION VALUE ADJUSTMENT METHOD OF VIBRATION RECTIFICATION ERROR CORRECTION CIRCUIT

(71) Applicant: Seiko Epson Corporation, Tokyo (JP)

(72) Inventors: Masayoshi Todorokihara, Suwa (JP); Kenta Sato, Shiojiri (JP)

(73) Assignee: SEIKO EPSON CORPORATION

( * ) Notice: Subject to any disclaimer, the term of this patent is extended or adjusted under 35 U.S.C. 154(b) by 1065 days.

(21) Appl. No.: 16/395,694

(22) Filed: Apr. 26, 2019

(65) Prior Publication Data

US 2019/0331491 A1    Oct. 31, 2019

(30) Foreign Application Priority Data

Apr. 27, 2018   (JP) ................................ 2018-086187

(51) Int. Cl.
| | | |
|---|---|---|
| *G01C 19/5614* | (2012.01) | |
| *G01P 15/125* | (2006.01) | |
| *G01C 19/5719* | (2012.01) | |
| *G01P 15/13* | (2006.01) | |
| *G01H 17/00* | (2006.01) | |
| *G01H 3/00* | (2006.01) | |
| *G01P 15/10* | (2006.01) | |
| *G01P 15/08* | (2006.01) | |

(52) U.S. Cl.
CPC ..... *G01C 19/5614* (2013.01); *G01C 19/5719* (2013.01); *G01H 3/005* (2013.01); *G01H 17/00* (2013.01); *G01P 15/10* (2013.01); *G01P 15/125* (2013.01); *G01P 15/132* (2013.01); *G01P 2015/0822* (2013.01)

(58) Field of Classification Search
CPC ............ G01C 19/5614; G01C 19/5719; G01P 15/125; G01P 15/132; G01P 15/10; G01P 21/00; G01D 18/00; G01H 3/005
See application file for complete search history.

(56) References Cited

U.S. PATENT DOCUMENTS

| | | | | |
|---|---|---|---|---|
| 4,467,651 | A * | 8/1984 | Peters ................... | G01P 15/097 73/DIG. 1 |
| 5,205,171 | A * | 4/1993 | O'Brien ................ | G01P 15/131 73/514.18 |
| 5,394,345 | A | 2/1995 | Berard et al. | |
| 5,926,275 | A * | 7/1999 | Sanders ............... | G01C 19/728 356/464 |

(Continued)

FOREIGN PATENT DOCUMENTS

| | | |
|---|---|---|
| JP | H09-033563 A | 2/1997 |
| JP | 2012-227870 A | 11/2012 |

*Primary Examiner* — Helen C Kwok
(74) *Attorney, Agent, or Firm* — Harness, Dickey & Pierce, P.L.C.

(57) ABSTRACT

A vibration rectification error correction circuit includes a first correction circuit that obtains a digital value based on a signal to be measured output from a sensor element configured to measure a physical quantity and corrects a vibration rectification error of the digital value by a correction function based on a product of values obtained by biasing the digital value.

9 Claims, 13 Drawing Sheets

(56) References Cited

U.S. PATENT DOCUMENTS

| | | | |
|---|---|---|---|
| 5,946,097 A * | 8/1999 | Sanders | G01C 19/721 |
| | | | 356/464 |
| 7,257,512 B1 * | 8/2007 | Ackerman | G01C 21/10 |
| | | | 73/488 |
| 2003/0010123 A1 * | 1/2003 | Malvern | G01P 15/132 |
| | | | 73/514.32 |
| 2004/0025590 A1 * | 2/2004 | Schaad | G01P 15/18 |
| | | | 73/514.29 |
| 2005/0081632 A1 * | 4/2005 | Malvern | G01P 15/125 |
| | | | 73/514.12 |
| 2006/0195305 A1 * | 8/2006 | LaFond | G01C 19/5719 |
| | | | 703/2 |
| 2008/0105050 A1 * | 5/2008 | Kraetz | G01C 19/5719 |
| | | | 73/496 |
| 2012/0116707 A1 * | 5/2012 | Malvern | G01P 21/00 |
| | | | 73/1.38 |
| 2016/0223357 A1 * | 8/2016 | Frey, Jr. | G01C 25/005 |
| 2017/0102248 A1 * | 4/2017 | Maurer | G01C 25/005 |

* cited by examiner

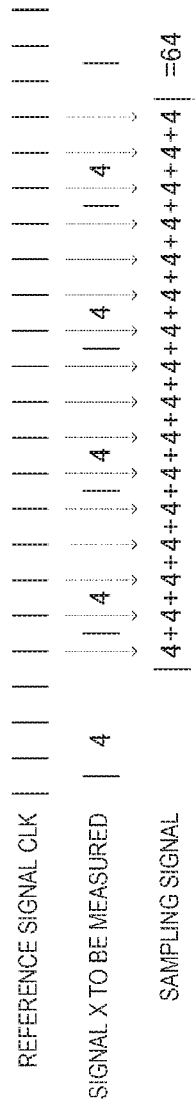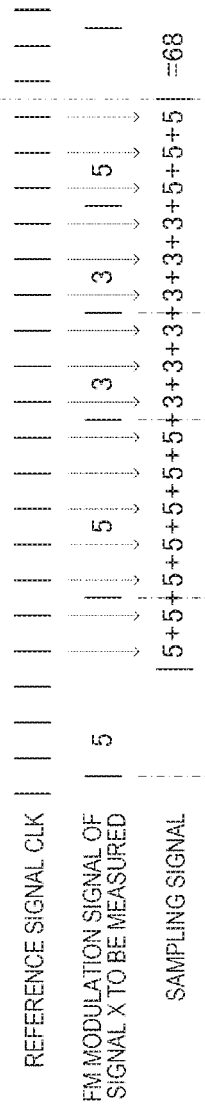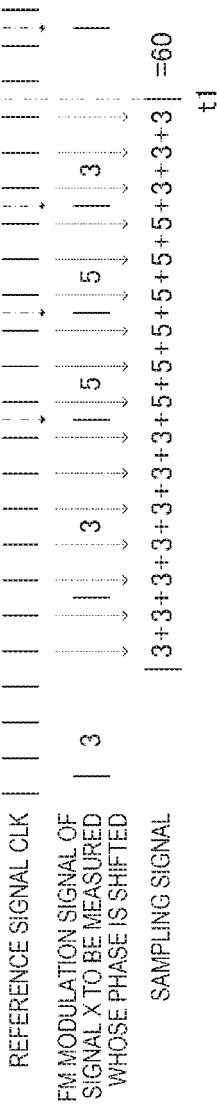
FIG. 13A
FIG. 13B
FIG. 13C

VIBRATION RECTIFICATION ERROR CORRECTION CIRCUIT, PHYSICAL QUANTITY SENSOR MODULE, STRUCTURE MONITORING DEVICE, AND CORRECTION VALUE ADJUSTMENT METHOD OF VIBRATION RECTIFICATION ERROR CORRECTION CIRCUIT

The present application is based on and claims priority from JP Application Serial Number 2018-086187, filed Apr. 27, 2018, the disclosure of which is hereby incorporated by reference herein in its entirety.

BACKGROUND

1. Technical Field

The present disclosure relates to a vibration rectification error correction circuit, a physical quantity sensor module, a structure monitoring device, and a correction value adjustment method of the vibration rectification error correction circuit.

2. Related Art

In a device or system including a sensor element, in a case in which linearity of an output signal output from the sensor element is good with respect to an applied signal applied to the sensor element, an average value of the output signal becomes zero when the applied signal is sine wave vibration. On the other hand, in a device or system in which the output signal output from the sensor element is nonlinear with respect to the applied signal applied to the sensor element, distortion occurs in the output signal with respect to the applied signal. In a case where the sine wave vibration is input as an applied signal to such a device or system having nonlinearity, the average value of the output signal may not become zero in some cases. In such an output signal, a vibration rectification error (VRE) is contained.

The vibration rectification error is an error signal generated by the device or system having nonlinearity and is not originally contained in the applied signal. Such a rectification error signal may affect performance of a processing system or an application system coupled to a rear stage of the device or system. For example, in a measurement apparatus using a sensor having nonlinearity, measurement accuracy may be lowered due to the vibration rectification error due to the nonlinearity. For example, in an acceleration sensor used for environmental measurement, the performance of low drift (low error) is desired for a signal with a wide dynamic range in order to measure a broadband vibration component in a structural vibration environment and acoustic vibration environment.

In general, as a technique for reducing the vibration rectification error, there is known a technique of reducing the vibration rectification error by providing a restoring force actuator in the acceleration sensor and performing feedback control on the restoring force actuator based on a measurement signal of the acceleration sensor. With this configuration, the influence of vibration rectification error is reduced. Specifically, a known vibration signal is supplied to the acceleration sensor along a predetermined axis to measure the vibration rectification error. Then, a feedback gain setting value is adjusted until the vibration rectification error becomes smaller than a predetermined threshold value.

Here, in JP-A-9-33563, a technique for correcting nonlinearity with respect to a problem such as nonlinearity of an output value with respect to a physical quantity to be applied in a physical quantity sensor that measures the physical quantity such as acceleration is disclosed.

JP-A-9-33563 is an example of the related art.

However, since the vibration rectification error is nonlinear, there is a possibility that a correction computation for correcting the vibration rectification error becomes complicated and a computation load for correcting the vibration rectification error increases.

SUMMARY

A vibration rectification error correction circuit according to an aspect of the present disclosure includes a first correction circuit that obtains a digital value based on a signal to be measured output from a sensor element configured to measure a physical quantity and corrects a vibration rectification error of the digital value by a correction function based on a product of values obtained by biasing the digital value.

In the vibration rectification error correction circuit according to the aspect of the present disclosure, the correction function may be a quadratic function, and a quadratic coefficient of the quadratic function may be 1.

In the vibration rectification error correction circuit according to the aspect of the present disclosure, a frequency delta sigma modulation circuit, a second correction circuit that includes a first filter circuit and a second filter circuit and corrects the vibration rectification error based on a filter characteristic of the first filter circuit and a filter characteristic of the second filter circuit may be further provided, and the frequency delta sigma modulation circuit may generate a frequency delta sigma modulation signal obtained by performing frequency delta sigma modulation on a reference signal using an operation signal based on the signal to be measured, the first filter circuit may be provided on an output side of the frequency delta sigma modulation circuit and may operate in synchronization with the operation signal, the second filter circuit may be provided on an output side of the first filter circuit and may operate in synchronization with the reference signal, and a signal output from the second filter circuit may be input to the first correction circuit.

A physical quantity sensor module according to another aspect of the present disclosure includes the vibration rectification error correction circuit according to the aspect of the present disclosure, and the sensor element.

In the physical quantity sensor module according to the aspect of the present disclosure, the sensor element may measure at least one of mass, acceleration, angular velocity, angular acceleration, electrostatic capacitance, and temperature as a physical quantity.

A structure monitoring device according to another aspect of the present disclosure includes the physical quantity sensor module according to the aspect of the present disclosure, a receiver receiving a measurement signal from the physical quantity sensor module attached to a structure, and a calculator calculating an inclination angle of the structure based on a signal output from the receiver.

A correction value adjustment method of a vibration rectification error correction circuit according to another aspect of the present disclosure is a correction value adjustment method of a vibration rectification error correction circuit which includes a first correction circuit that obtains a digital value based on a signal to be measured output from a sensor element configured to measure a physical quantity and corrects a vibration rectification error of the digital value by a correction function based on a product of values obtained by biasing the digital value, a frequency delta sigma modulation circuit for generating a frequency delta sigma modulation signal obtained by performing frequency delta sigma modulation on a reference signal using an operation signal based on the signal to be measured, and a second correction circuit that includes a first filter circuit provided on an output side of the frequency delta sigma modulation circuit and operating in synchronization with the operation signal and a second filter circuit provided on an output side of the first filter circuit and operating in synchronization with the reference signal to output a signal to the first correction circuit, and corrects the vibration rectification error based on a filter characteristic of the first filter circuit and a filter characteristic of the second filter circuit. The method includes adjusting a correction value of the correction function of the first correction circuit, and adjusting the filter characteristic of the first filter circuit and the filter characteristic of the second filter circuit of the second correction circuit, in which the adjusting of the correction value is performed before the adjusting of the filter characteristic.

BRIEF DESCRIPTION OF THE DRAWINGS

FIGS. 13A-C are views for explaining the principle of adjusting nonlinearity of input and output characteristics of the high frequency band correction circuit.

DESCRIPTION OF EXEMPLARY EMBODIMENTS

Hereinafter, preferred embodiments of the present disclosure will be described in detail. The drawings used are for convenience of explanation. The embodiments explained below are not unduly limit the contents of the disclosure. All of the configurations described below are not essential components.

1. Sensor Output Detection Circuit 1.1 First Embodiment

Figure 1:
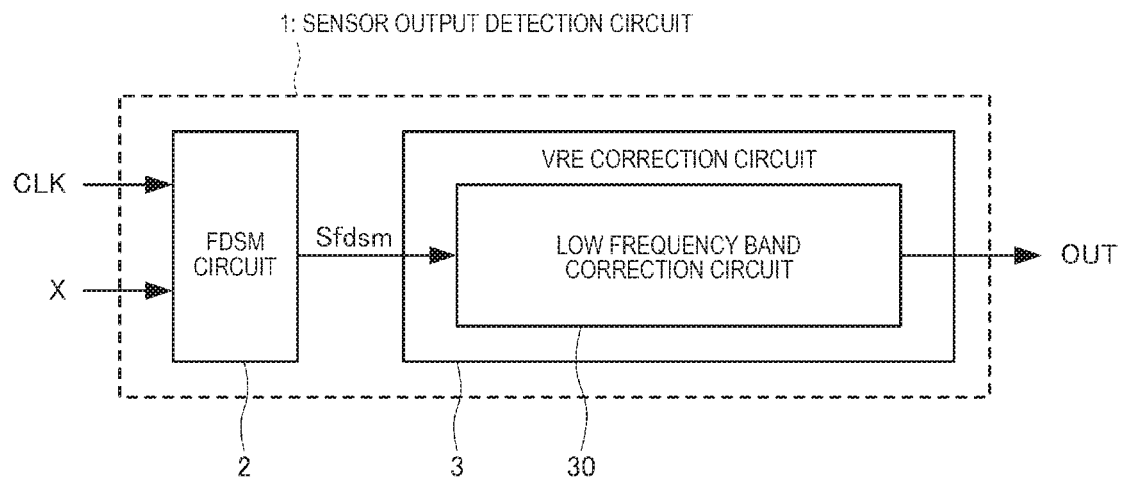
FIG. 1 is a block diagram illustrating functional blocks of a sensor output detection circuit according to a first embodiment.

FIG. 1 is a block diagram illustrating functional blocks of a sensor output detection circuit 1 of a first embodiment. As illustrated in FIG. 1, the sensor output detection circuit 1 of the first embodiment includes a frequency delta-sigma modulator (FDSM) circuit 2 and a vibration rectification error (VRE) correction circuit 3.

Figure 18:
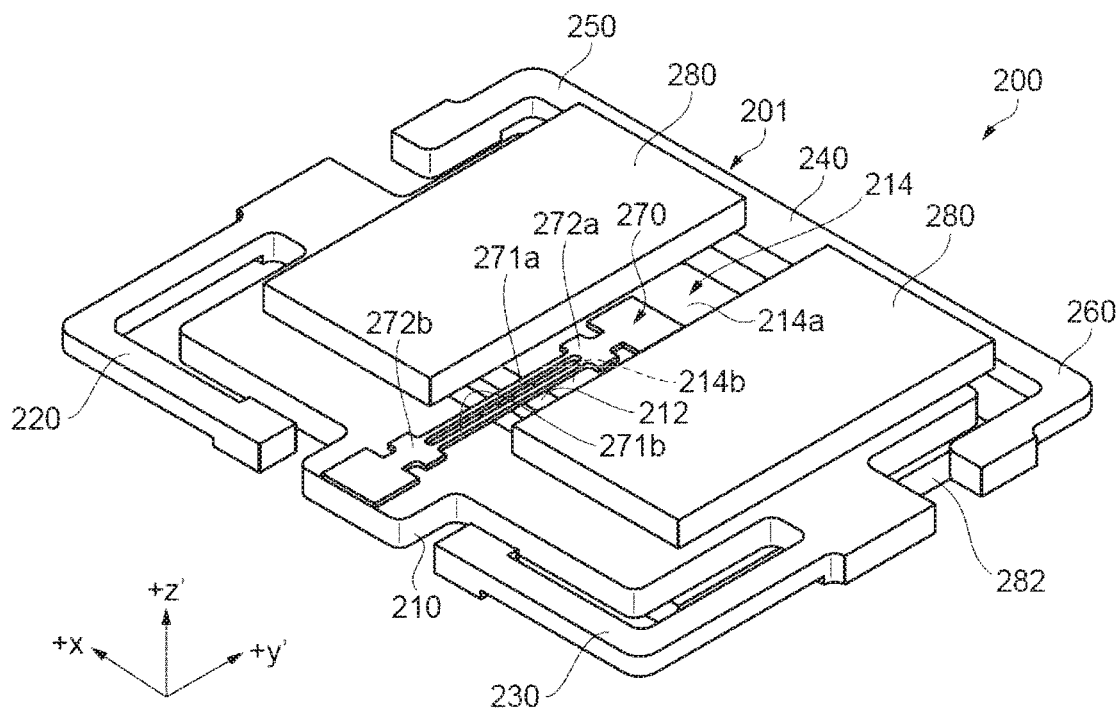
FIG. 18 is a perspective view for explaining a schematic configuration of a sensor element.

A reference signal CLK and a signal X to be measured output from a sensor element configured to measure the physical quantity as illustrated in FIG. 18, for example, are input to the sensor output detection circuit 1. The sensor output detection circuit 1 measures a frequency ratio between the signal X to be measured and the reference signal CLK by a reciprocal count method and outputs the frequency ratio as a reciprocal count output signal OUT. In the following description, although description is made on the assumption that the signal X to be measured output from the sensor element is directly input to the sensor output detection circuit 1, an operation signal based on the signal X to be measured may be input to the sensor output detection circuit 1. Here, the operation signal based on the signal X to be measured is a signal correlated with the signal X to be measured, and also includes the signal X to be measured itself. The sensor element in this embodiment is a frequency change type sensor element whose frequency changes according to a measurement level of a physical quantity.

In the frequency change type sensor element as illustrated in this embodiment, when an input and output relationship of a system including the sensor element is nonlinear, a vibration rectification error (hereinafter, referred to as VRE) may occur.

Figure 2:
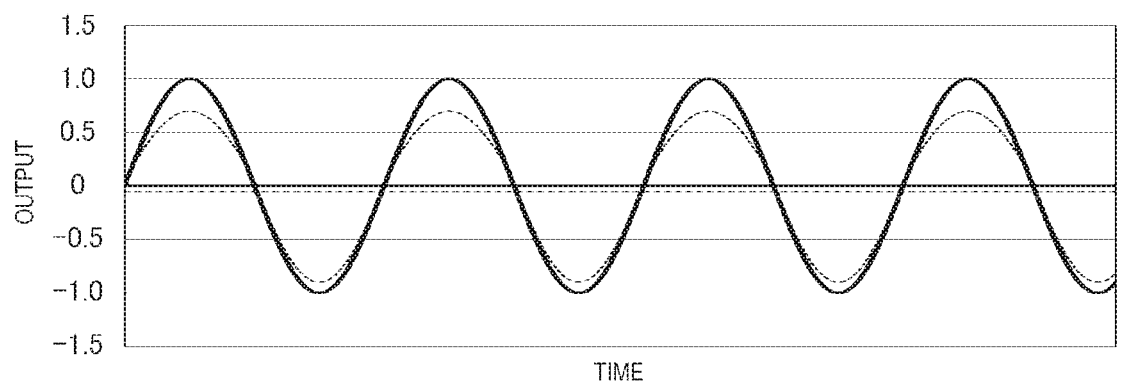
FIG. 2 is a graph for explaining an outline of a vibration rectification error (VRE).

FIG. 2 is a graph for explaining an outline of the VRE. In a case where a sine wave vibration is applied, as an applied physical quantity, to a system in which an applied physical quantity applied to the sensor element and an oscillation frequency output from the sensor element are linear, the signal output from the sensor element is output as a sine wave vibration signal as indicated by the solid line in FIG. 2. Accordingly, an average value of a rectified signal obtained by rectifying the signal output from the sensor element is ideally zero. That is, when the applied physical quantity applied to the sensor element and the oscillation frequency output from the sensor element are linear, drift component does not occur in the signal output from the sensor element.

On the other hand, when sine wave vibration is applied as applied physical quantity to a system in which the applied physical quantity applied to the sensor element and the oscillation frequency output from the sensor element are nonlinear, as illustrated by a broken line in FIG. 2, the signal output from the sensor element is output as a signal in which distortion has occurred with respect to the applied sine wave vibration. Therefore, the average value of the rectified signal obtained by rectifying the signal output from the sensor element may not become zero in some cases. That is, when the applied physical quantity applied to the sensor element and the oscillation frequency output from the sensor element are nonlinear, a drift component may occur in the signal output from the sensor element. In such a system where the input and output relationship is nonlinear, the drift component occurring in the output signal is called VRE.

Here, factors causing the VRE will be described in detail with reference to FIGS. 3 to 5.

Figure 3:
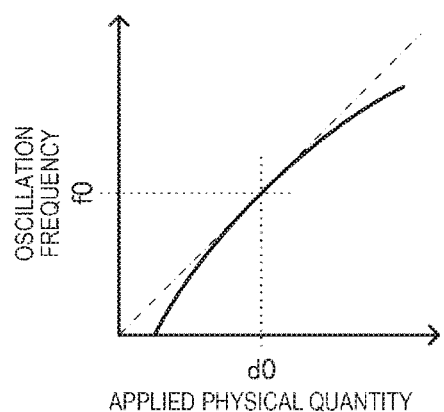
FIG. 3 is a graph illustrating a relationship between an applied physical quantity and an oscillation frequency.

FIG. 3 is a graph illustrating the relationship between the applied physical quantity applied to the sensor element and the oscillation frequency output from the sensor element. In FIG. 3, the relationship between the applied physical quantity of the sensor element and the oscillation frequency having nonlinearity is exemplified by using the applied physical quantity on the horizontal axis and the oscillation frequency on the vertical axis. In FIG. 3, the relationship between the applied physical quantity and the oscillation frequency when the input and output characteristic of the sensor element is assumed to be linear is exemplified by a one-dot chain line. A reference value d0 of the applied physical quantity illustrated in FIG. 3 is a physical quantity applied to the sensor element in the steady state, and a reference value f0 of the oscillation frequency is an oscillation frequency when the applied physical quantity is the reference value d0.

In the example illustrated in FIG. 3, the oscillation frequency when the applied physical quantity is larger than the reference value d0 and when the applied physical quantity is smaller than the reference value d0 is lower than the oscillation frequency when it is assumed that the input and output characteristics of the sensor element are linear.

Figure 4:
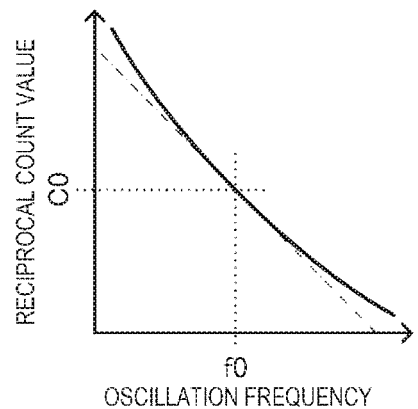
FIG. 4 is a graph illustrating a relationship between the oscillation frequency and a reciprocal count value.

FIG. 4 is a graph illustrating a relationship between an oscillation frequency output from the sensor element and a reciprocal count value corresponding to the oscillation frequency. In FIG. 4, the relationship between the oscillation frequency and the reciprocal count value is illustrated with the horizontal axis representing the oscillation frequency and the vertical axis representing the reciprocal count value. In FIG. 4, the relationship between the oscillation frequency and the reciprocal count value is exemplified by a one-dot chain line when it is assumed that the reciprocal count value is corrected to be linear with respect to the oscillation frequency. A reference value C0 of the reciprocal count value illustrated in FIG. 4 is a reciprocal count value when the oscillation frequency of the sensor element is the reference value f0.

In the example illustrated in FIG. 4, when the oscillation frequency is larger than the reference value f0 and when the oscillation frequency is smaller than the reference value f0, the reciprocal count value is larger than a reciprocal count value corrected so as to be linear with respect to the oscillation frequency.

Figure 5:
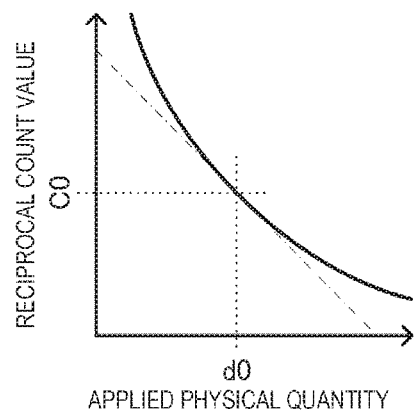
FIG. 5 is a graph illustrating a relationship between the applied physical quantity and the reciprocal count value.

FIG. 5 is a graph illustrating the relationship between the applied physical quantity and the reciprocal count value based on FIGS. 3 and 4. In FIG. 5, the relationship between a detection value and the reciprocal count value is illustrated with the horizontal axis representing the applied physical quantity and the vertical axis representing the reciprocal count value. In FIG. 5, the relationship between the applied physical quantity and the reciprocal count value when the applied physical quantity and the reciprocal count value are assumed to be linear is exemplified by a one-dot chain line.

In the example illustrated in FIG. 5, when the applied physical quantity is larger than the reference value d0 and a case where the applied physical quantity is smaller than the reference value d0, the reciprocal count value becomes higher than the reciprocal count value assumed to be linear. In this case, a deviation between the reciprocal count value and the one-dot chain line is a factor causing the VRE.

In the example illustrated in FIG. 5, nonlinearity due to the input and output characteristics of the sensor element as illustrated in FIG. 3 and nonlinearity due to the reciprocal count value as illustrated in FIG. 4 are superimposed. That is, the input and output characteristics of the sensor element has nonlinearity, and furthermore, when the oscillation frequency output from the sensor element is measured by the reciprocal method, the VRE may increase. Such a VRE may affect the performance of a processing system or an application system coupled to a stage subsequent to a device or system including the sensor element, and in general, the correction circuit corrects the relationship between the applied physical quantity and a final output value so as to be linear.

The sensor output detection circuit 1 according to the first embodiment includes the VRE correction circuit 3 for reducing a computation load for correcting such VRE and additionally improving correction accuracy. Hereinafter, the configuration of the sensor output detection circuit 1 in the first embodiment will be described in detail. In the following description, a case where an oscillation frequency output from the sensor element is measured by the reciprocal method will be described, but correction may be made so as to obtain the same effect even when the oscillation frequency output from the sensor element is measured by the direct count method.

When referring back to FIG. 1, the FDSM circuit 2 generates an FDSM signal (frequency delta sigma modulation signal) Sfdsm obtained by performing frequency delta sigma modulation on the reference signal CLK using an operation signal based on the signal X to be measured.

Figure 6:
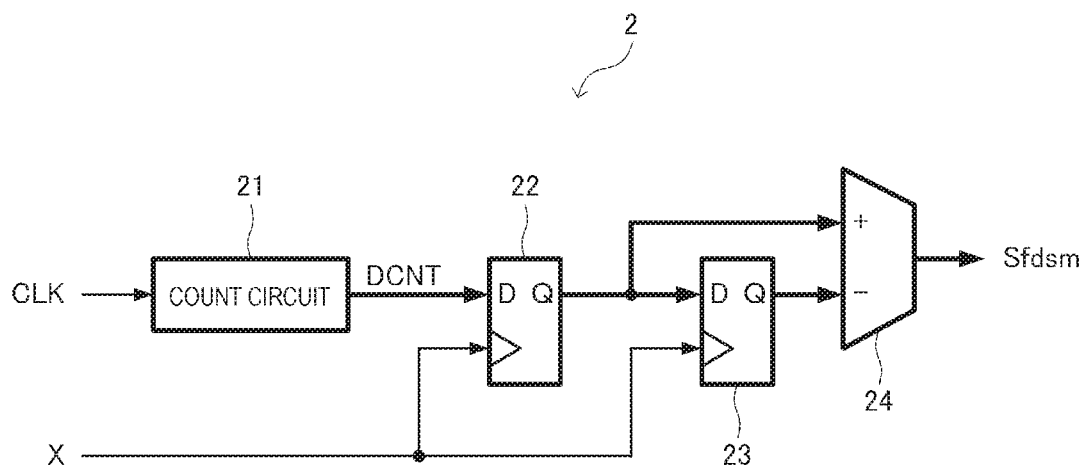
FIG. 6 is a circuit diagram illustrating a configuration of an FDSM circuit.

FIG. 6 is a circuit diagram illustrating a configuration of the FDSM circuit 2. The FDSM circuit 2 includes a count circuit 21, D flip-flop circuits 22 and 23, and a subtractor 24. For simplicity of illustration, in FIG. 6, only one D flip-flop circuit 22 and one D flip-flop circuit 23 are illustrated, but in reality, N D flip-flop circuits 22 and D flip-flop circuits 23 exist.

The count circuit 21 receives the reference signal CLK. The count circuit 21 counts rising edges of the reference signal CLK. Then, an N-bit count value DCNT indicating the count value is generated.

Each of the N D flip-flop circuits 22 captures and holds the N-bit count value DCNT output from the count circuit 21 in synchronization with the rising edge of the signal X to be measured.

Each of the N D flip-flop circuits 23 captures and holds the N-bit count value DCNT held in each of the N D flip-flop circuits 22 in synchronization with the rising edge of the signal X to be measured.

The subtractor 24 subtracts the N-bit value held by each of the N D flip-flop circuits 23 from the value of the N-bit signal held by each of the N D flip-flop circuits 22 and outputs the FDSM signal Sfdsm. That is, the value of the FDSM signal Sfdsm output from the subtractor 24 corresponds to the number of edges of the reference signal CLK in the most recent one cycle of the signal X to be measured.

As described above, the FDSM circuit 2 outputs the reciprocal count value correlated with the frequency of the signal X to be measured output from the sensor element as the FDSM signal Sfdsm.

When referring back to FIG. 1, the VRE correction circuit 3 includes a low frequency band correction circuit 30. The VRE correction circuit 3 corrects the VRE included in the FDSM signal Sfdsm output from the FDSM circuit 2 and outputs the VRE as a reciprocal count output signal OUT.

Specifically, the low frequency band correction circuit 30 included in the VRE correction circuit 3 includes a VRE correction function expressed in the form of factorization. The low frequency band correction circuit 30 corrects the VRE of the signal X to be measured output from the sensor element configured to measure the physical quantity by computing the product of respective factors of the VRE correction function. Here, the frequency band of VRE corrected by the low frequency band correction circuit 30 is preferably set to a frequency band to be measured by a device or system including a sensor element for measuring the physical quantity.

As described above, the VRE is caused by nonlinearity of the input and output relationship of the system including the sensor element. That is, the VRE has nonlinearity with respect to the applied physical quantity applied to the sensor element and the oscillation frequency of the sensor element which changes accompanying the applied physical quantity. Accordingly, the VRE correction function for correcting the VRE is represented by a polynomial having the oscillation frequency of the sensor element as a variable in order to cancel the nonlinearity. However, when correction of VRE is performed using the polynomial, the number of times of computation of the product increases as the order of the VRE correction function increases, and as a result, the computation load of the VRE correction circuit 3 may increase. In the VRE correction function illustrated in the first embodiment, it is possible to reduce an increase in the number of times of computations of the product as the order of the polynomial which is the correction function increases and to reduce the computation load of the VRE correction circuit 3 in the correction of VRE.

Expression (1) is an example of the VRE correction function included in the low frequency band correction circuit 30. In the Expression (1), the reciprocal count value of the oscillation frequency which is a signal input to the low frequency band correction circuit 30 and is output from the sensor element is set as a detection value C as a digital value and corrected values used for computation in order to correct the VRE are set as correction values A1 to Ap. Here, the detection value C in the first embodiment corresponds to the FDSM signal Sfdsm illustrated in FIG. 1. The correction values A1 to Ap are arbitrarily set values for correcting the VRE and can be arbitrarily set according to the characteristics of various components configurations of the device or the system including the sensor element and the sensor element.

$$\mathrm{OUT} = (C - A1) \cdot (C - A2) \ldots (C - Ap) \quad (1)$$

Figure 7:
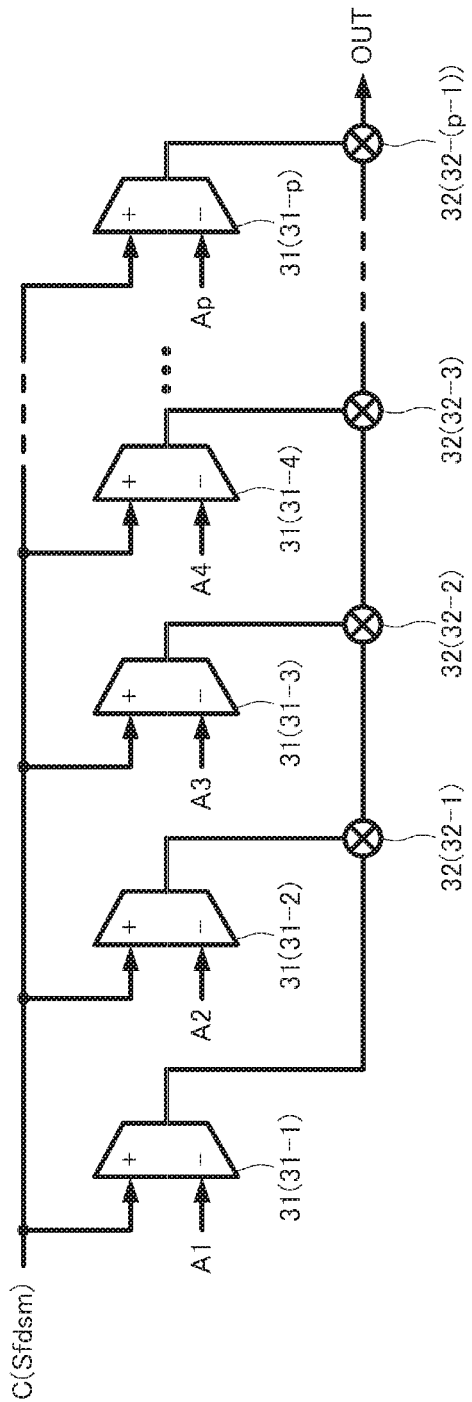
FIG. 7 is a circuit diagram illustrating a configuration of a low frequency band correction circuit according to the first embodiment.

FIG. 7 is a circuit diagram illustrating a configuration of the low frequency band correction circuit 30 corresponding to the expression (1). As illustrated in FIG. 7, the low frequency band correction circuit 30 obtains the detection value C which is a digital value based on the signal X to be measured output from the sensor element configured to measure the physical quantity and corrects the vibration rectification error of the detection value C by a correction function based on the product (multiplication) of the value obtained by biasing the detection value C with the correction values A1 to Ap.

As illustrated in FIG. 7, the low frequency band correction circuit 30 includes p subtractors 31 (31-1 to 31-$p$) and (p−1) multipliers 32 (32-1 to 32-($p$−1)).

The subtractor 31-1 subtracts a correction value A1 from the FDSM signal Sfdsm output from the FDSM circuit 2. The subtractor 31-2 subtracts a correction value A2 from the FDSM signal Sfdsm. Similarly, the subtractor 31-$i$ (i is any one of 1 to p) subtracts a correction value Ai from the FDSM signal Sfdsm. An output value of the subtractor 31-$i$ corresponds to the value obtained by biasing the FDSM signal Sfdsm. The correction values A1 to Ap may be set and changed from outside the sensor output detection circuit 1, or may be stored in a register (not illustrated) or the like, for example.

The multiplier 32-1 multiplies the signal output from the subtractor 31-1 by the signal output from the subtractor 31-2.

The multiplier 32-2 multiplies the signal output from the multiplier 32-1 by the signal output from the subtractor 31-3. The multiplier 32-3 multiplies the signal output from the multiplier 32-2 by the signal output from the subtractor 31-4. Similarly, the multiplier 32-$j$ (j is anyone of 2 to (p−1)) multiplies the signal output from the multiplier 32-($j$−1) by the signal output from the subtractor 31-($j$+1). The multiplier 32-($p$−1) multiplies the signal output from the multiplier 32-($p$−2) by the signal output from the subtractor 31-$p$ and outputs the multiplication result as the reciprocal count output signal OUT.

As described above, in the sensor output detection circuit 1 according to the first embodiment, the VRE is corrected by using the pth-order correction function expressed in the form of factorization so as to make it possible to correct the VRE by the number of p−1 times of computations in the low frequency band correction circuit 30 provided in the VRE correction circuit 3. Therefore, it is possible to reduce the number of times of computations of the product occurring at the time of the correction computation without reducing correction accuracy of the VRE, and it is possible to reduce the load of the correction computation of the VRE.

Since it is possible to reduce the number of times of product computations, it is also possible to reduce the complexity of the configuration of the sensor output detection circuit 1.

The low frequency band correction circuit 30 described above corresponds to a "first correction circuit" in the first embodiment.

1.2. Second Embodiment

Next, the sensor output detection circuit 1 of the second embodiment will be described. The sensor output detection circuit 1 of the second embodiment is different from the first embodiment in that the VRE correction function included in the low frequency band correction circuit 30 is a quadratic polynomial expressed in the factorization form and is indicated by a power of factor. In describing the sensor output detection circuit 1 of the second embodiment, the same reference numerals are given to the same configurations as those of the first embodiment, and the description thereof will be omitted.

The VRE is a function of the oscillation frequency output from the sensor element due to the input applied physical quantity, and if the oscillation frequency due to the applied physical quantity is constant, the magnitude of VRE is proportional to the square of amplitude of the output signal of the sensor element due to the applied physical quantity. That is, the VRE correction function may be a quadratic function. As illustrated in the first embodiment, when the VRE correction function is a function of third order or higher, it is possible to enhance followability of the VRE by the correction function, and it is possible to improve the correction accuracy of the VRE. On the other hand, when the VRE correction function is a quadratic function, it is possible to further reduce the number of times of computation of the product generated in the correction computation of the VRE, and it is possible to further reduce the computation load accompanying the correction of VRE.

Expression (2) is an example of a VRE correction function expressed by a quadratic polynomial. Here, the coefficient a illustrated in the expression (2) is a constant indicating correction sensitivity of the VRE correction function, and the reference value C0 is a reference value of the reciprocal count value described above.

The detection value C illustrated in the first term of the expression (2) corresponds to the reciprocal count value output from the FDSM circuit 2. The second term is obtained by subtracting the reference value C0 from the detection value C and multiplying the square of the subtracted value by a, and corresponds to the VRE. That is, in the VRE correction function illustrated in the expression (2), the correction computation of the VRE is performed by subtracting the VRE from the detection value C which is the reciprocal count value including the VRE.

$$\text{OUT} = C - a \cdot (C - C0) \quad (2)$$

Expression (3) is a polynomial expression obtained by expanding the expression (2).

$$\text{OUT} = -a \cdot C^2 + (1 + 2 \cdot a \cdot C0) \cdot C + C0^2 \quad (3)$$

Here in the expression (3), the coefficient a indicating correction sensitivity of the VRE correction function is a value set so that the characteristics of the sensor element and the sensor output detection circuit 1 are close to linear. Accordingly, instead of multiplying the second term of expression (2) by a, the first term of expression (2) may be multiplied by 1/a, and an equivalent VRE correction effect that approximates the characteristic to linear can be obtained. In other words, in the VRE correction functions illustrated by a quadratic function, the quadratic coefficients may be corrected to be one. With this configuration, it is possible to omit computation of the product of the coefficient a in the quadratic term in the computation of the VRE correction function, and it is possible to reduce the computation load of the VRE correction function. Positive or negative of the coefficient a indicates an inclination of the VRE correction function in the correction of VRE. That is, the coefficient a can be either positive or negative.

From the matters as described above, the polynomial of expression (3) representing the VRE correction function may be expressed as the expression (4).

$$\text{OUT} = C^2 - \left(\frac{1}{a} + 2C_0\right) \cdot C + C_0^2 \quad (4)$$

Expression (5) is an example of the VRE correction function in the second embodiment.

$$\text{OUT} = (C - A1) \cdot (C - A2) \quad (5)$$

Expression (6) is a polynomial expression obtained by expanding the expression (5).

$$\text{OUT} = C^2 - (A1 + A2) \cdot C + A1 \cdot A2 \quad (6)$$

The VRE correction function may be corrected so as to approximate linearly when no physical quantity is applied to the sensor element, that is, by using the reciprocal count value with respect to the reference value d0 of the applied physical quantity as a reference. Therefore, the VRE correction function may correct the detection value C based on the oscillation frequency output from the sensor element for the inclination in the case where the reference value C0 is set as a reference. Accordingly, in the expressions (4) and (6), the coefficients relating to the detection value C may be the same, in other words, the correction values A1 and A2 indicated in the expression (6) may be set so as to satisfy the relationship of the expression (7).

$$(A1 + A2) = \frac{1}{a} + 2C_0^2 \quad (7)$$

Here, the correction values A1 and A2 are arbitrary values set according to the characteristics of the system including the sensor element, and in the second embodiment, it suffices to satisfy the relationship of the expression (7). Accordingly, the correction value A1 and the correction value A2 may be the same value, and in this case, the expression (7) is expressed by the expression (8).

$$A1 = A2 = A = \frac{1}{2a} + C_0 \quad (8)$$

From the matters as described above, the VRE correction function in the second embodiment can be represented as a power of factor as indicated in the expression (9) by setting the correction values A1 and A2 indicated in the expression (5) as a common correction value A. Thus, it is unnecessary to hold a plurality of correction values and it is possible to reduce complication of the circuit.

$$\text{OUT} = (C - A)^2 \quad (9)$$

Figure 8:
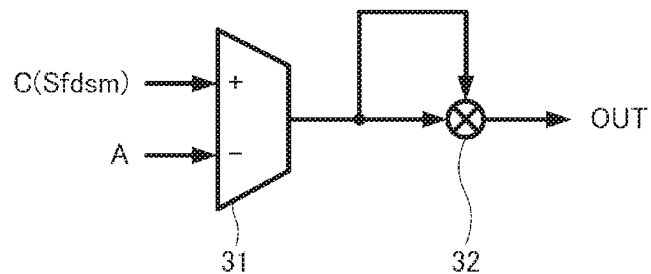
FIG. 8 is a circuit diagram illustrating a configuration of a low frequency band correction circuit according to a second embodiment.

Here, a circuit configuration of the low frequency band correction circuit 30 for realizing the configuration of the expression (9) will be described with reference to FIG. 8. FIG. 8 is a circuit diagram illustrating a configuration of the low frequency band correction circuit 30 corresponding to the expression (9). The low frequency band correction circuit 30 includes the subtractor 31 and the multiplier 32.

The subtractor 31 subtracts the correction value A from the FDSM signal Sfdsm output from the FDSM circuit 2.

The signal output from the subtractor 31 is branched and each of the branched signals is input to the multiplier 32. That is, the multiplier 32 squares the signal output from the subtractor 31. Then, the multiplier 32 outputs the computation result as the reciprocal count output signal OUT.

In the low frequency band correction circuit 30 configured as described above, it is unnecessary to hold a plurality of correction values A (A1 to Ap) and accordingly, a register or the like for holding a plurality of correction values A (A1 to Ap) is not required. Furthermore, since each factor is common, correction operation of the VRE becomes possible by one subtractor 31. Accordingly, in the sensor output detection circuit 1 according to the second embodiment, the VRE correction circuit 3 can be further miniaturized.

As described above, in the sensor output detection circuit 1 according to the second embodiment, the same effect as that of the sensor output detection circuit 1 in the first embodiment can be achieved, in the low frequency band correction circuit 30 provided in the VRE correction circuit 3, by correcting the VRE by the secondary correction function expressed in the form of factorization. It is possible to further reduce the number of times of computation of the product generated in the correction computation.

In the sensor output detection circuit 1 according to the first embodiment, it is possible to reduce the number of registers and the like for storing the correction values by setting the correction values A1 and A2 included in each factor of the VRE correction function expressed in the factorization form as the same correction value A, in the low frequency band correction circuit 30 provided in the VRE correction circuit 3. Furthermore, the subtractor 31 can also be used in common by setting the common correction value A. Accordingly, it is possible to miniaturize the VRE correction circuit 3 and the low frequency band correction circuit 30.

The low frequency band correction circuit 30 described above corresponds to a "first correction circuit" in the second embodiment.

1.3. Third Embodiment

Figure 9:
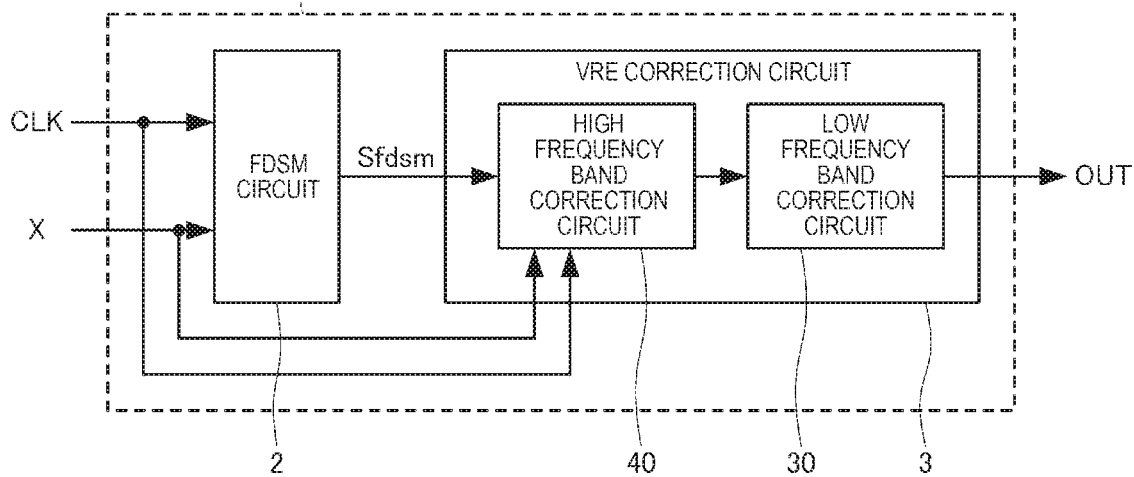
FIG. 9 is a block diagram illustrating functional blocks of a sensor output detection circuit according to a third embodiment.

FIG. 9 is a block diagram illustrating functional blocks of the sensor output detection circuit 1 according to a third embodiment. As illustrated in FIG. 9, the sensor output detection circuit 1 of the third embodiment is different from the sensor output detection circuit 1 of the first embodiment and the second embodiment in that the VRE correction circuit 3 further includes a high frequency band correction circuit 40. The low frequency band correction circuit 30 illustrated in FIG. 9 may have any of the configurations of the first embodiment and the second embodiment. In describing the sensor output detection circuit 1 of the third embodiment, the same reference numerals are given to the same configurations as those of the first embodiment and the second embodiment, and the description thereof will be omitted.

The FDSM signal Sfdsm output from the FDSM circuit 2, the signal X to be measured, and the reference signal CLK are input to the high frequency band correction circuit 40. Then, the output signal of the high frequency band correction circuit 40 is input to the low frequency band correction circuit 30 as the detection value C.

Figure 10:
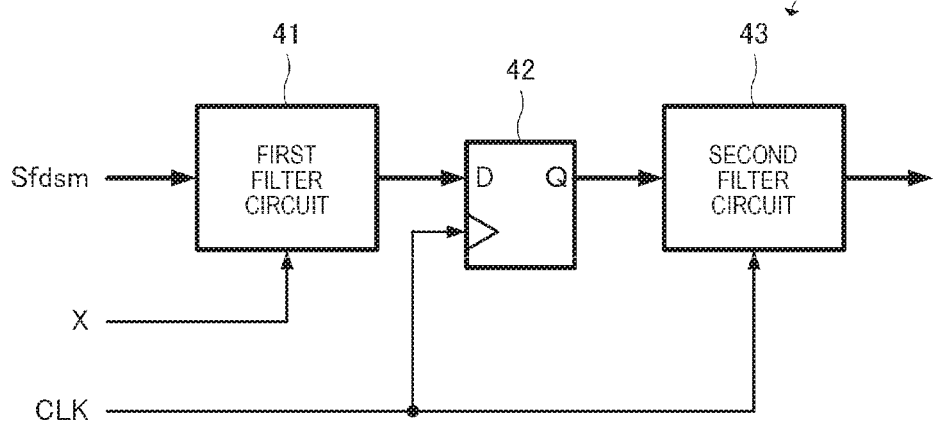
FIG. 10 is a block diagram illustrating a configuration of a high frequency band correction circuit.

FIG. 10 is a block diagram illustrating a configuration of the high frequency band correction circuit 40. The high frequency band correction circuit 40 includes a first filter circuit 41, a D flip-flop circuit 42, and a second filter circuit 43. In the high frequency band correction circuit 40, the first filter circuit 41 is provided on the output side of the FDSM circuit 2 and operates in synchronization with the signal X to be measured. The second filter circuit 43 is provided on the output side of the first filter circuit 41 and operates in synchronization with the reference signal CLK. The output signal of the second filter circuit 43 is input to the low frequency band correction circuit 30. Among the circuits, the high frequency band correction circuit 40 corrects the VRE based on the filter characteristics of the first filter circuit 41 and the second filter circuit 43. The D flip-flop circuit 42 is provided between the first filter circuit 41 and the second filter circuit 43, holds an output of the first filter circuit 41 in synchronization with the reference signal CLK, and outputs the output to the second filter circuit 43.

Here, it is preferable that the frequency band of VRE corrected by the high frequency band correction circuit 40 is set to a frequency band in which the VRC is expected to increase in a device or a system having a sensor element for measuring the physical quantity. The frequency band in which the VRC is expected to increase includes, for example, a frequency band containing the natural frequency of the device or the system.

Figure 11:
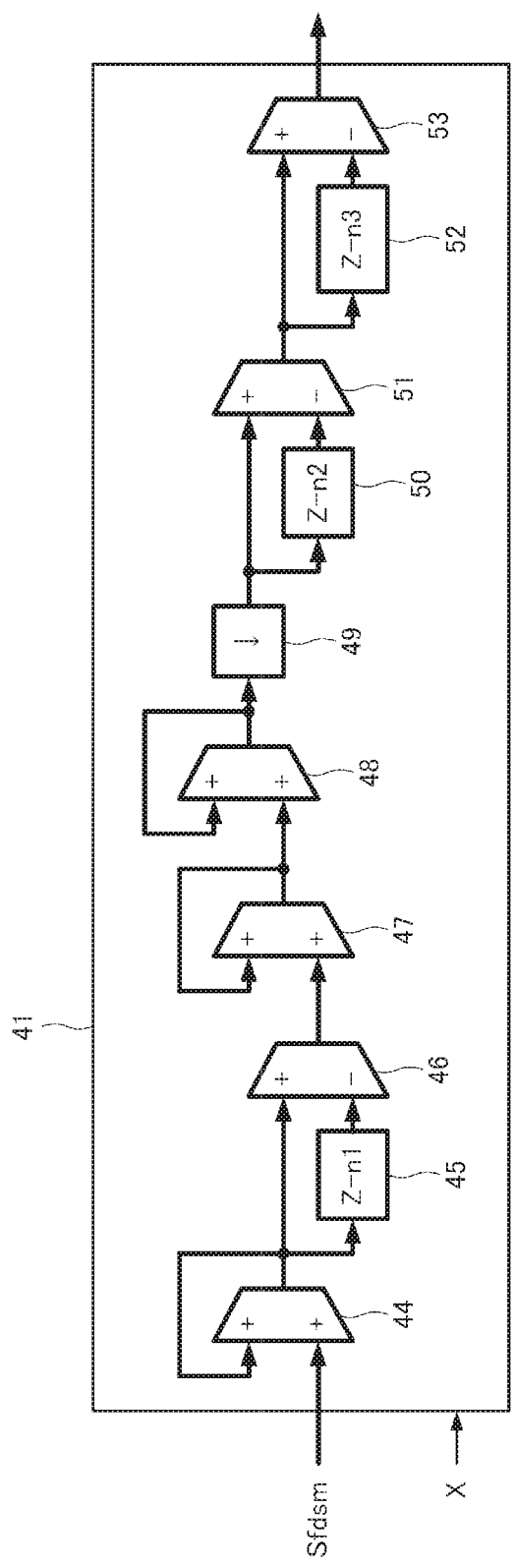
FIG. 11 is a circuit diagram illustrating a configuration of a first filter circuit.

FIG. 11 is a circuit diagram illustrating a configuration of the first filter circuit 41. The first filter circuit 41 includes adders 44, 47 and 48, delay circuits 45, 50 and 52, subtractors 46, 51 and 53, and a decimator 49. Each unit of the first filter circuit 41 operates in synchronization with the signal X to be measured. Each of a delay number n1 illustrated in the delay circuit 45, a delay number n2 illustrated in the delay circuit 50, and a delay number n3 illustrated in the delay circuit 52 indicates the number of filter taps, and may be changeable from the outside of the sensor output detection circuit 1. Among the constituent elements included in the first filter circuit 41, the front stage portion including the adder 44, the delay circuit 45, and the subtractor 46 functions as a moving average filter. Also, among the constituent elements included in the first filter circuit 41, the rear stage portion including the adders 47 and 48, the decimator 49, the delay circuits 50 and 52, and the subtractors 51 and 53 functions as a cascaded integrator comb (CIC) filter.

Figure 12:
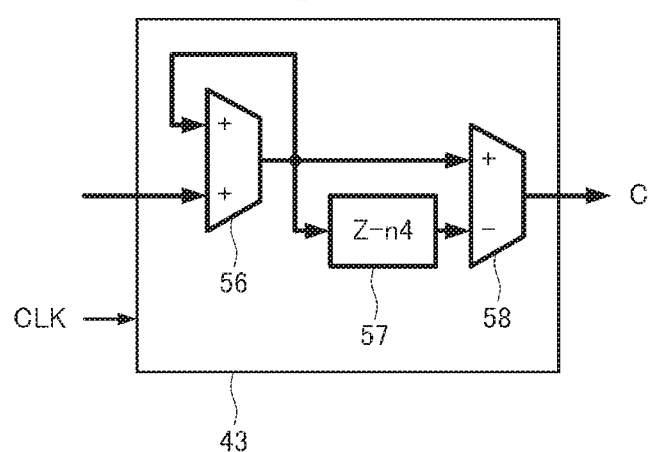
FIG. 12 is a circuit diagram illustrating a configuration of a second filter circuit.

FIG. 12 is a circuit diagram illustrating a configuration of the second filter circuit 43. The second filter circuit 43 includes an adder 56, a delay circuit 57, and a subtractor 58. Each unit of the second filter circuit 43 operates in synchronization with the reference signal CLK. The delay number n4 illustrated in the delay circuit 57 indicates the number of filter taps and may be changeable from the outside of the sensor output detection circuit 1. The second filter circuit 43 functions as a moving average filter.

In the high frequency band correction circuit 40 illustrated in FIGS. 10 to 12, it is possible to arbitrarily set and change the input and output characteristics of the high frequency band correction circuit 40 by arbitrarily setting and changing the delay numbers n1, n2, and n3 of the first filter circuit 41 and the delay number n4 of the second filter circuit 43.

Specifically, the first filter circuit 41 functions as a multistage moving average filter that operates based on the signal X to be measured. The phase of the output signal with respect to the input signal of the first filter circuit 41 is delayed by $(n1-1+R\cdot(n2+n3-1))/2$ clocks, where R is a decimation ratio of the decimator 49.

The second filter circuit 43 functions as a moving average filter which operates based on the reference signal CLK. The output signal of the first filter circuit 41 is input to the second filter circuit 43. Then, the second filter circuit 43 sequentially takes out and smoothes the input signal based on the delay number n4.

As such, the high frequency band correction circuit 40 adjusts a cutoff frequency and the smoothing timing by individually setting the delay numbers n1, n2, n3, and n4 to realize an arbitrary input and output characteristics.

At this time, the cutoff frequency of the high frequency band correction circuit 40 realized by connecting the first filter circuit 41 and the second filter circuit 43 is set to be lower than a frequency band in which the VRC is expected to increase in a device or system including the sensor element. With this configuration, it is possible to reduce the influence of a signal in the frequency band in which the VRC is expected to increase on the reciprocal count output signal OUT output from the sensor output detection circuit 1.

Here, the operation of the high frequency band correction circuit 40 will be described with reference to FIGS. 13A-C. FIGS. 13A-C are diagrams for explaining the principle of adjusting nonlinearity of the input and output characteristics of the high frequency band correction circuit 40. In FIGS. 13A-13C, the reference signal CLK, the signal X to be measured, and the sampling signal output from the second filter circuit 43 are illustrated in order from the top with the right direction as a passage of time. In FIGS. 13A-C, the timings of the rising edges of the reference signal CLK and the signal X to be measured are indicated by short vertical lines. Furthermore, in FIGS. 13A-C, numerical values representing the output signals of the first filter circuit 41 which operates at the timing of the rising edge of the signal X to be measured are also written between respective rising edges of the signal X to be measured. In the description of FIGS. 13A-C, for the sake of convenience, a period of each of the reference signal CLK, the signal X to be measured, and the sampling signal is indicated by a simple ratio, and a value obtained by taking only a phase difference into account is set as an output value of the first filter circuit 41, but is not limited thereto.

At the timing of the rising edge of the reference signal CLK, the second filter circuit 43 takes in the output signal of the first filter circuit 41 by the D flip-flop circuit 42 operating in synchronization with the reference signal CLK and performs smoothing processing. Then, the second filter circuit 43 outputs the result of smoothing processing to the low frequency band correction circuit 30. In FIGS. 13A-C, while paying attention to arbitrary operation timing t1, the start time point and the end time point of a smoothing period are indicated by short vertical lines, and along with the course of the smoothing processing, numerical values representing the output signals of the second filter circuit 43 are also written. The length of the smoothing period is determined by a clock period based on the reference signal CLK and the delay number n4 of the delay circuit 57 of the second filter circuit 43.

The first filter circuit 41 takes in the FDSM signal Sfdsm at the timing of the rising edge of the signal X to be measured and outputs the result of the smoothing processing. The FDSM signal Sfdsm is a frequency ratio fc/fx of a frequency fx of the signal X to be measured and a frequency fc of the reference signal CLK. That is, the first filter circuit 41 performs the smoothing processing on the frequency ratio fc/fx between the signal X to be measured and the reference signal CLK. The length of the smoothing period and the delay amount are determined by the clock period based on the signal X to be measured and the delay numbers n1, n2, and n3 of the first filter circuit 41.

In FIG. 13A, an example in which the ratio between the frequency fc of the reference signal CLK and the frequency fx of the signal X to be measured is a constant integer value is illustrated. In a case where the ratio between the frequency fc and the frequency fx is a constant integer value, the result of the smoothing processing of the first filter circuit 41 is a constant value corresponding to the frequency fx of the signal X to be measured. In FIG. 13A, for the convenience of explanation, "4" which is the number of rising edges of the reference signal CLK included between rising edges of the signal X to be measured is expressed as a numerical value representing the output signal of the second filter circuit 43.

Then, the second filter circuit 43 takes in the output signal of the first filter circuit 41 at the rise timing of the reference signal CLK and outputs the result of the smoothing processing. In FIGS. 13A-C, as a result of the smoothing processing of the second filter circuit 43, values obtained by simply integrating values taken in the smoothing period are illustrated. In the example illustrated in FIG. 13A, the sampling signal is "64".

In FIG. 13B, an example in which, with respect to FIG. 13A, FM modulation is performed while maintaining the sum of the reciprocal count values in the repeating sections of the signal X to be measured and then the delay numbers n1, n2, and n3 of the first filter circuit 41 are adjusted so that a phase of an input signal and a phase of an output signal are in phase is illustrated. The timing of the rising edge of the signal X to be measured is periodically changed by the FM modulation and the output value of the first filter circuit 41 which is the result of the smoothing processing also periodically changes. With this change, the reciprocal count value also changes to "5" or "3" in FIG. 13B. The second filter circuit 43 integrates "5" or "3" based on the reference signal CLK. The reciprocal count value is weighted according to this timing. In FIG. 13B, the phase of the input signal and the phase of the output signal are adjusted so as to be in phase. Therefore, the larger the reciprocal count value is, the greater weighting is done. In the example illustrated in FIG. 13B, the sampling signal is "68".

In FIG. 13C, an example in which, when the signal X to be measured is FM-modulated as illustrated in FIG. 13B, the delay numbers n1, n2, and n3 of the first filter circuit 41 are adjusted so that the phase of the input signal and the phase of the output signal are opposite to each other in the phases, is illustrated.

The matters that the timing of the rising edge of the signal X to be measured is periodically changed by the FM modulation and the output value of the first filter circuit which is the result of the smoothing process also periodically changes are the same as in the case of FIG. 13B. Also in FIG. 13C, the reciprocal count value also changes to "5" or "3", the phases of the input and output signals becomes opposite to those in the case of FIG. 13B. The second filter circuit 43 integrates "5" or "3" based on the reference signal CLK. That is, the same applies to the matters that the reciprocal count value is weighted. However, in FIG. 13C, since the phase of the input signal and the phase of the output signal are adjusted so as to be opposite to each other in the phase, the smaller the reciprocal count value is, the greater weighting is done. In the example illustrated in FIG. 13C, the sampling signal is "60".

Generally, by adjusting the phase of the input signal and the phase of the output signal after performing FM modulation on the signal X to be measured, it is possible to control a drift amount of a DC component of the sampling signal output from the second filter circuit 43. In the example of FIGS. 13A-C, with respect to the sampling signal "64" in the case of no drift, the sampling signal can be adjusted to "68" by making the input and output relationship of the first filter circuit 41 in phase and "60" by making the input and output relationship of the first filter circuit 41 in opposite phase. Furthermore, it is also possible to control the drift amount of the intermediate value by further adjusting the phase of the first filter circuit 41.

The output signal of the second filter circuit 43 changes according to the mechanism described above by providing a configuration for adjusting the timing at which a signal is output from the first filter circuit 41, and thus, it is also possible to control the amount of drift without changing the cutoff frequency.

In the case where the frequency of the signal X to be measured does not vary as illustrated in FIG. 13A, the length of the smoothing period by the first filter circuit 41 and the processing result of smoothing do not vary even when the timing at which the signal is output from the first filter circuit 41 is delayed. Accordingly, the output of the second filter circuit 43 does not vary.

As such, by changing the settings of the delay numbers n2 and n3 of the first filter circuit 41, it is possible to delay the timing at which the signal is output from the first filter circuit 41. As a result, it is possible to generate nonlinearity in the input and output characteristics of the high frequency band correction circuit 40.

By adjusting the nonlinearity caused in the high frequency band correction circuit 40 so as to cancel out the nonlinearity of the input and output characteristics originally possessed by the sensor element and the sensor output detection circuit 1, it is possible to weaken the influence of the nonlinearity of the input and output characteristics originally possessed by the sensor element and the sensor output detection circuit 1. With this configuration, it becomes possible to make the input and output characteristics of the sensor element and the sensor output detection circuit 1 as a whole close to linear, and it becomes possible to reduce the VRE.

In the description of FIGS. 13A-C, the filter characteristic of the first filter circuit 41 is adjusted only at the delay numbers n2 and n3, but by adjusting the delay number n1, more detailed filter characteristic adjustment becomes possible. As illustrated in FIG. 11, the delay number n1 is the number of filter taps of the delay circuit 45, and operates based on the signal X to be measured. On the other hand, the delay numbers n2 and n3 are the number of filter taps of the delay circuits 50 and 52 provided at the subsequent stage of the decimator 49 in the first filter circuit 41. Accordingly, the delay circuits 50 and 52 operate based on a signal obtained by decimating the signal X to be measured. The delay circuits 50 and 52 operate based on a signal having a slow frequency with respect to the delay circuit 45. Therefore, the delay numbers n2 and n3 of the delay circuits 50 and 52 allow phase adjustment within a larger range. As such, in the first filter circuit 41, it is possible to adjust the filter characteristics in more detail by adjusting the delay numbers n1, n2, and n3. The high frequency band correction circuit 40 described above corresponds to a "second correction circuit".

Here, an adjustment method of the correction values A1 to Ap of the low frequency band correction circuit 30 and the delay numbers n1, n2, n3, and n4 for setting and changing the filter characteristics of the high frequency band correction circuit 40 will be described with reference to FIGS. 14 and 15.

Figure 14:
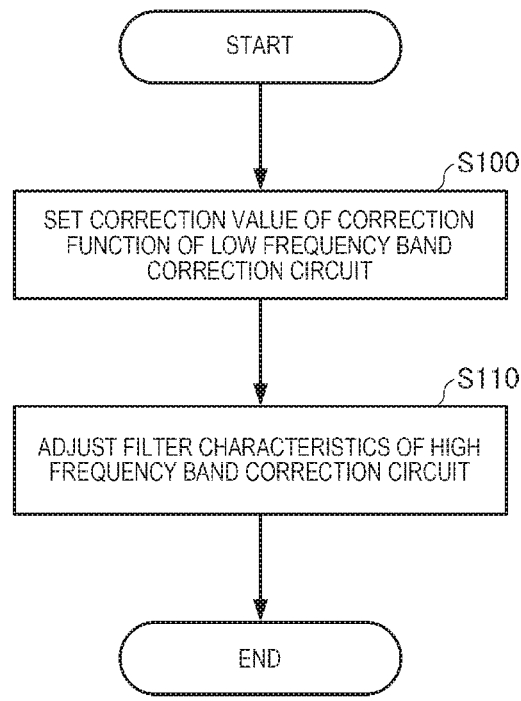
FIG. 14 is a flowchart illustrating an adjustment procedure of a correction value and a filter characteristic.

FIG. 14 is a flowchart illustrating a correction value adjustment method for adjusting the correction value, the filter characteristics, and the like. As illustrated in FIG. 14, adjustment of the correction values A1 to Ap and the delay numbers n1, n2, n3 and n4 is performed in such a way that a first adjustment step of setting the correction values A1 to Ap of the VRE correction function of the low frequency band correction circuit 30 is performed first (S100) and then a second adjustment step of adjusting the filter characteristics of the high frequency band correction circuit 40 based on the delay numbers n1, n2, n3, and n4 is performed (S110). That is, the first adjustment step is performed before the second adjustment step.

In the VRE correction circuit 3 in the third embodiment, since nonlinear correction is performed by the low frequency band correction circuit 30 and the high frequency band correction circuit 40, there is a possibility that the corrections of the low frequency band correction circuit 30 and the high frequency band correction circuit 40 influence each other. As illustrated in FIG. 14, by performing the first adjustment step before the second adjustment step, it is possible to reduce the influence of the corrections of the low frequency band correction circuit 30 and the high frequency band correction circuit 40 on each other.

Here, with reference to FIG. 15, a procedure for adjusting the correction value and the filter characteristic of the VRE correction circuit 3 will be described in detail. FIG. 15 is a graph for explaining a method of adjusting the correction value and the filter characteristic. In FIG. 15, when adjustment is performed under the condition of n2=n3, the horizontal axis represents the values of the delay numbers n2 and n3 of the high frequency band correction circuit 40, and the vertical axis represents the VRC. In the following description, for convenience of explanation, the VRE correction function of the low frequency band correction circuit 30 will be described by applying the expression (9) described above. Therefore, the correction value A of the VRE correction function of the low frequency band correction circuit 30 is determined in accordance with the expression (8). A case where the delay number n1 of the high frequency band correction circuit 40 is fixed to "8" will be described as an example.

Figure 15:
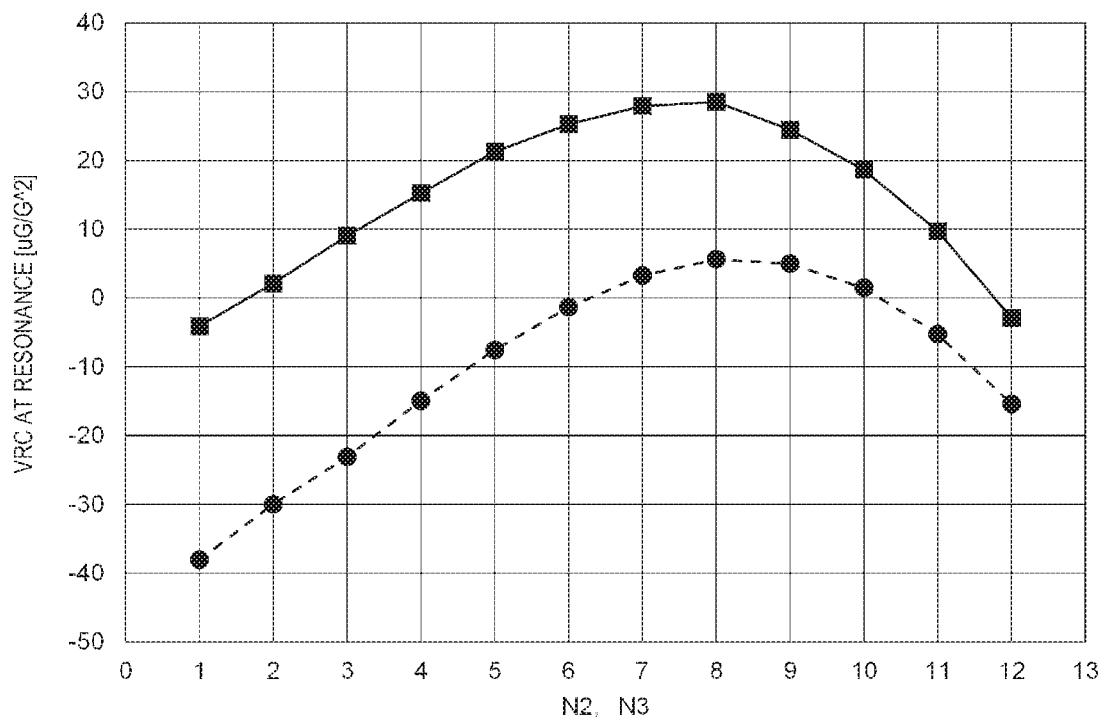
FIG. 15 is a graph for explaining an adjustment method of the correction value and the filter characteristic.

In FIG. 15, the VRC corrected by the VRE correction function including the correction value A defined in accordance with the expression (8) is indicated by a solid line with the delay numbers n2 and n3 as parameters (n2=n3). In FIG. 15, the VRC before the correction by the low frequency band correction circuit 30 is also indicated by a broken line.

In the example illustrated in FIG. 15, when the delay numbers n2 and n3 of the high frequency band correction circuit 40 are changed in order from 1 after correction is performed by the low frequency band correction circuit 30, the VRC approaches "0" most when the delay numbers n2 and n3 are "2" or "12". That is, by setting the delay numbers n2 and n3 to "2" or "12" as the filter characteristics of the high frequency band correction circuit 40, the VRE can be corrected with high accuracy. As described above, the delay numbers n2 and n3 can be adjusted in a large frequency range, and the delay number n1 can be adjusted in a fine frequency range. That is, when finer adjustment is required, the adjustment of the delay number n1 may be performed after the adjustment of the delay numbers n2 and n3 is completed.

The VRE correction function of the low frequency band correction circuit 30 is a quadratic function. Therefore, as illustrated in FIG. 15, when the delay numbers n2 and n3 are set as parameters, the VRC approaches 0 at two points obtained when the delay numbers n2 and n3 are set to "2" and when the delay numbers n2 and n3 are set to "12". Therefore, in the high frequency band correction circuit 40, the VRC can be reduced by setting the delay numbers n2 and n3 to either "2" or "12". In this case, either of "2" or "12" may be selected as the delay numbers n2 and n3, and for example, it may be selected as appropriate according to the noise level other than the VRE generated in the sensor output detection circuit 1, the circuit operation, and the like.

As described above, in the sensor output detection circuit 1 according to the third embodiment, the high frequency band correction circuit 40 that corrects the frequency band in which the VRC is expected to increase is provided in the VRE correction circuit 3, so that it is possible to reduce a signal with a large VRE. Therefore, it is possible to reduce the influence of the signal having the large VRE on the frequency band corrected by the low frequency band correction circuit 30. Therefore, it is possible to further reduce occurrence of the VRE in the frequency band of the physical quantity measured in the device or the system including the sensor element corrected by the low frequency band correction circuit 30.

Furthermore, after adjusting the correction value A of the low frequency band correction circuit 30, the filter characteristic of the high frequency band correction circuit 40 is determined to thereby make it possible to reduce the influence of the nonlinearity correction in the low frequency band correction circuit 30 and the nonlinearity correction in the high frequency band correction circuit 40 on each other and to efficiently determine the correction value and the filter characteristic for accurately performing the VRE correction.

2. Physical Quantity Sensor Module Including Sensor Output Detection Circuit

2.1 Application to Acceleration Sensor Module

The sensor output detection circuit 1 according to the first embodiment to the third embodiment described above can be applied to various physical quantity sensor modules. Here, description will be made using an acceleration sensor module having an acceleration sensor which includes the sensor output detection circuit 1 described above and a sensor element for measuring acceleration as a physical quantity.

The acceleration sensor according to this embodiment includes a cantilever having a mass portion and a sensor element. When acceleration is applied to the acceleration sensor, the cantilever is deformed, and the vibration frequency of the sensor element changes according to the deformation. The sensor output detection circuit 1 measures the applied acceleration by measuring the change in the vibration frequency of the sensor element.

Figure 16:
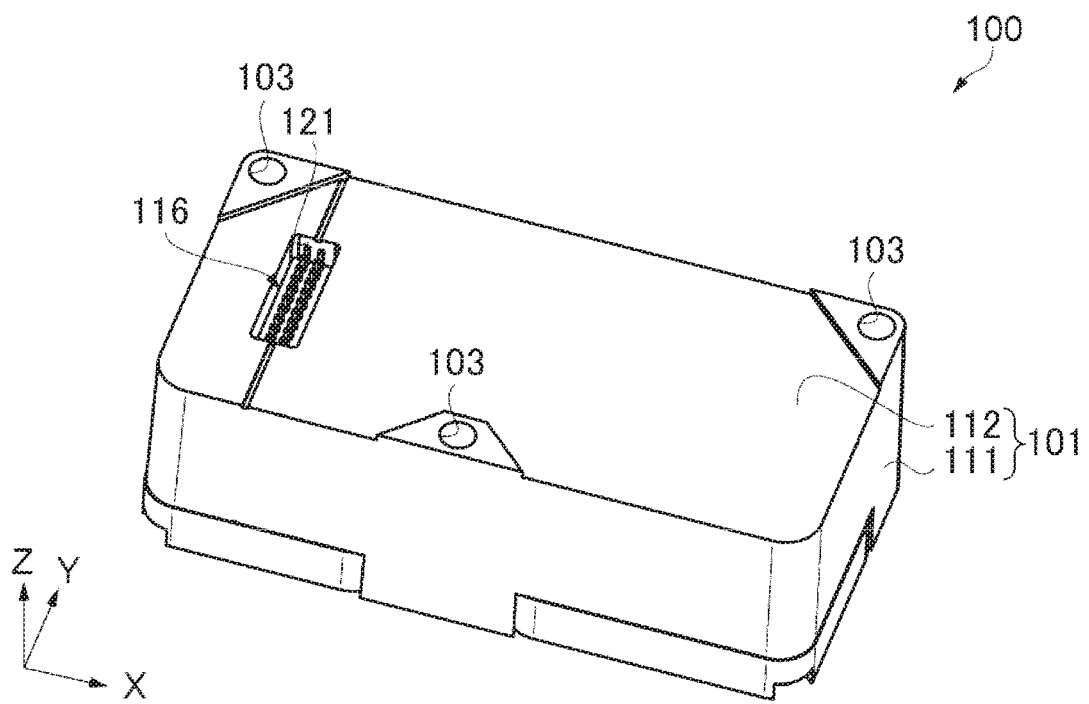
FIG. 16 is a perspective view illustrating a configuration of a physical quantity sensor module.
Figure 17:
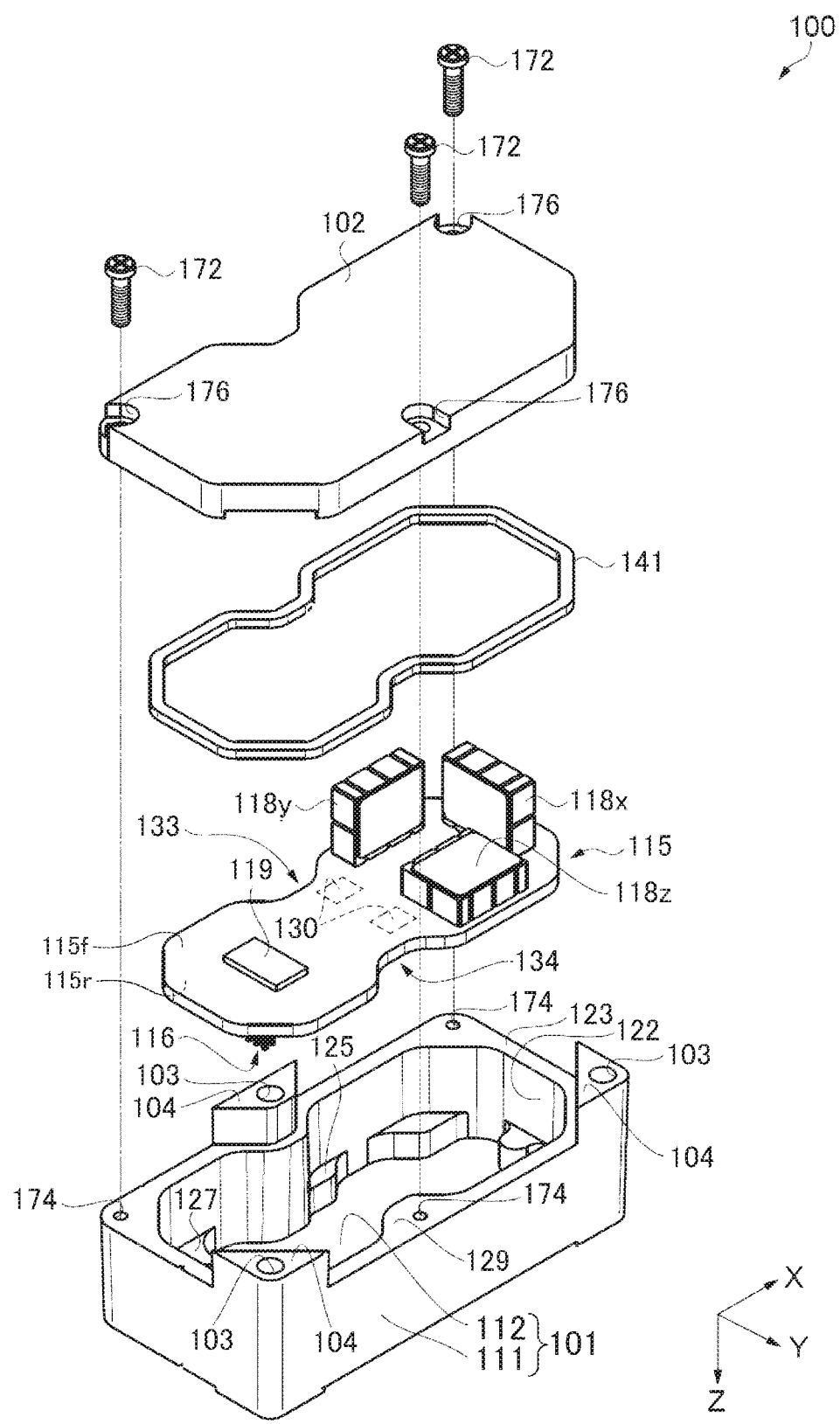
FIG. 17 is an exploded perspective view of the physical quantity sensor module.

With reference to FIGS. 16 and 17, a configuration of a physical quantity sensor module 100 that measures acceleration as a physical quantity will be described in detail. FIG. 16 is a perspective view illustrating the configuration of the physical quantity sensor module 100 when viewed from a side of a mounted surface to which the physical quantity sensor module 100 is fixed.

In the following description, description will be made by setting a direction along the long side of the physical quantity sensor module 100 having a rectangular shape in a plan view as an X-axis direction, setting a direction orthogonal to the X-axis direction in a plan view as a Y-axis direction, and setting a thickness direction of the physical quantity sensor module 100 as the Z-axis direction.

The physical quantity sensor module 100 is a rectangular parallelepiped having a rectangular planar shape. For example, the length of the long side along the X-axis direction is approximately 50 mm and the length of the short side along the Y-axis direction orthogonal to the X-axis direction is approximately 24 mm, and the thickness is about 16 mm. Screw holes 103 are formed at two places near both end portions of one long side and at one place in the central portion of the other long side. The physical quantity sensor module 100 is used in a fixed state to each of the three screw holes 103 through fixing screws, for example, on a mounted surface of a mounted object (device) of a structure such as a bridge or a bulletin board.

As illustrated in FIG. 16, an opening 121 is provided on the front surface of the physical quantity sensor module 100 when viewed from the mounted surface side. Inside the opening 121, a plug type connector 116 is disposed. The connector 116 has a plurality of pins disposed in two rows, and in each row, a plurality of pins are arranged in the Y-axis direction. A socket type connector (not illustrated) is coupled to a connector 116 from the mounted object, and a drive voltage of the physical quantity sensor module 100 and electric signals such as detection data are transmitted and received through the connector.

FIG. 17 is an exploded perspective view of the physical quantity sensor module 100. As illustrated in FIG. 17, the physical quantity sensor module 100 is configured to include a container 101, a lid portion 102, a seal member 141, a circuit board 115, and the like. More specifically, the physical quantity sensor module 100 is configured such that the circuit board 115 is attached to the interior of the container 101 with a fixing member 130 interposed therebetween, and the opening of the container 101 is covered with a lid portion 102 via a seal member 141 having cushioning property.

The container 101 is made of, for example, aluminum, and is an accommodation container of the circuit board 115 formed into a box shape having an internal space. The container 101 can be formed by scraping out aluminum, or by using a die casting method (mold casting method). The material of the container 101 is not limited to aluminum, but other metal such as zinc or stainless steel, a resin, a composite material of metal and resin, or the like may be used. The outer shape of the container 101 is a rectangular parallelepiped having a substantially rectangular planar shape similarly to the whole shape of the physical quantity sensor module 100 described above, and fixing projections 104 are provided at two places near both end portions of one long side and one place in the central portion of the other long side. The screw hole 103 is formed in each of the fixing projections 104. Here, the fixing projections 104 provided at two places near both end portions of one long side include the intersection of the short side and the long side, and are substantially triangular in a plan view. Further, the fixing projection 104 provided at one place in the central portion of the other long side has a substantially trapezoidal shape facing the inner space side of the container 101 in a plan view.

The container 101 has a box-like shape whose outer shape is rectangular parallelepiped and opened to one side. The interior of the container 101 is an internal space (accommodating space) surrounded by a bottom wall 112 and side walls 111. In other words, the container 101 has a box shape having one surface facing the bottom wall 112 as an opening surface 123, and the outer edge of the circuit board 115 is disposed (accommodated) along an inner surface 122 of the side wall 111, and the lid portion 102 is fixed so as to cover the opening. Here, an opening surface 123 facing the bottom wall 112 is a surface on which the lid portion 102 is placed. On the opening surface 123, the fixing projections 104 are erected at two places near both end portions of one long side and one place in the central portion of the other long side of the container 101. The upper surface (surface exposed in the −Z-direction) of the fixing projections 104 is flush with the upper surface of the container 101.

A projection 129, which is the center portion of one long side opposed to the fixing projection 104 provided at the central portion of the other long side and protrudes from the side wall 111 toward the internal space from the bottom wall 112 to the opening surface 123, is provided in the internal space of the container 101. A female screw 174 is provided on the upper surface (the same surface as the opening surface 123) of the projection 129. The lid portion 102 is fixed to the container 101 through the seal member 141 by screws 172 and the female screws 174 inserted through the through-holes 176. Here, similar to the projection 129, the fixing projection 104 provided at the central portion of the other long side may be configured to be protruded from the side wall 111 toward the internal space from the bottom wall 112 to the opening surface 123. The projection 129 and the fixing projection 104 are provided at positions facing constricted portions 133 and 134 of the circuit board 115 described later.

In the inner space of the container 101, a first pedestal 127 and a second pedestal 125 which project in a stepwise manner from the bottom wall 112 toward the opening surface 123 side by one step are provided. The first pedestal 127 is provided at a position opposed to a disposition area of the plug type (male) connector 116 attached to the circuit board 115, and an opening 121 (see FIG. 16) into which the plug type (male) connector 116 is inserted is provided. The first pedestal 127 functions as a pedestal for fixing the circuit board 115 to the container 101. The opening 121 penetrates the inside (inner side) and the outside of the container 101.

The second pedestal 125 is positioned on the side opposite to the first pedestal 127 with respect to the fixing projection 104 and the projection 129 respectively positioned at the central portions of the long sides and is provided in the vicinity of the fixing projection 104 and the projection 129. The second pedestal 125 may be connected to either the fixing projection 104 or the projection 129. The second pedestal 125 functions as a pedestal for fixing the circuit board 115 to the container 101 on the side opposite to the first pedestal 127 with respect to the fixing projection 104 and the projection 129.

Although the outer shape of the container 101 has been described as being a rectangular parallelepiped having a substantially rectangular planar shape and a box-like shape without a lid, but is not limited thereto, and the planar shape of the outer shape of the container 101 may be a square shape, a hexagonal shape, an octagonal shape, or the like. In the planar shape of the outer shape of the container 101, corners of apex portions of a polygon may be chamfered, and furthermore, any of sides may be a planar shape formed by a curve. The planar shape of the interior of the container 101 is also not limited to the shape described above, and other shapes may be adopted. Furthermore, the outer shape of the container 101 and the planar shape of the inside thereof may be similar or not similar.

The circuit board 115 is a multilayer board having a plurality of through-holes and the like formed therein, and a glass epoxy board is used as the circuit board 115. The circuit board 115 is not limited to a glass epoxy board, but may be a rigid board capable of mounting a plurality of physical quantity sensors, electronic components, connectors, and the like. For example, a composite substrate or ceramic substrate may also be used.

The circuit board 115 has a second surface 115r on the bottom wall 112 side and a first surface 115f which is in a front and back relationship with the second surface 115r. On the first surface 115f of the circuit board 115, a control IC 119 as a processor and acceleration sensors 118x, 118y, and 118z as physical quantity sensors are mounted. The connector 116 is mounted on the second surface 115r of the circuit board 115. Although illustration and explanation thereof are omitted, other wiring, terminal electrodes, and the like may be provided on the circuit board 115.

The circuit board 115 includes the constricted portions 133 and 134 whose outer edges of the circuit board 115 are constricted at the central portion in the X-axis direction along the long side of the container 101 in a plan view. The constricted portions 133, 134 are provided on both sides of the circuit board 115 in the Y-axis direction in a plan view and constricted from the outer edge of the circuit board 115 toward the center. The constricted portions 133 and 134 are provided to face the projection 129 and the fixing projection 104 of the container 101.

The circuit board 115 is inserted into the internal space of the container 101 with the second surface 115r facing the first pedestal 127 and the second pedestal 125. The circuit board 115 is supported by the container 101 by the first pedestal 127 and the second pedestal 125.

Acceleration sensors 118x, 118y, and 118z for measuring acceleration as a physical quantity respectively measure accelerations in one axial direction. Specifically, the acceleration sensor 118x is erected so that the front and back surfaces of a package are oriented in the X-axis direction and also the side surfaces face the first surface 115f of the circuit board 115. Then, the acceleration sensor 118x measures acceleration applied in the X-axis direction. The acceleration sensor 118y is erected such that the front and back surfaces of the package are oriented in the Y-axis direction and also the side surfaces face the first surface 115f of the circuit board 115. Then, the acceleration sensor 118y measures acceleration applied in the Y-axis direction. The acceleration sensor 118z is provided so that the front and back surfaces of the package are oriented in the Z-axis direction, that is, the front and back surfaces of the package are directly face the first surface 151f of the circuit board 115. Then, the acceleration sensor 118z measures acceleration applied in the Z-axis direction.

The control IC 119 as a processor is electrically coupled to the acceleration sensors 118x, 118y, and 118z through wirings (not illustrated). The control IC 119 is a micro controller unit (MCU), and incorporates the sensor output detection circuit 1, a storing unit, and the like, and controls each unit of the physical quantity sensor module 100. The storing unit includes a nonvolatile memory. In the storing unit, a correction value A and the delay numbers n1, n2, n3, and n4 for correcting the VRE in the sensor output detection circuit 1, a program defining a sequence and content for measuring acceleration, a program for digitizing detection data and incorporating the detection data into packet data, accompanying data, and the like are stored. Although not illustrated, a plurality of other electronic components or the like may be mounted on the circuit board 115. Three sensor output detection circuits 1 corresponding to the respective acceleration sensors 118x, 118y, and 118z may be provided in the control IC 119.

Here, the configurations of the acceleration sensors 118x, 118y, and 118z will be described with reference to FIGS. 18 and 19.

FIG. 18 is a perspective view for explaining a schematic configuration of a sensor element for measuring acceleration. FIG. 19 is a cross-sectional view illustrating a schematic configuration of an acceleration detector using the sensor element for measuring acceleration.

In FIG. 18, an x-axis, a y'-axis, and a z'-axis are illustrated as three axes orthogonal to each other. An example in which, in (for) each of the axes, in an orthogonal coordinate system consisting of the x-axis as an electric axis of quartz crystal which is a piezoelectric material used as a base material of an acceleration sensor, a y-axis as a mechanical axis, and a z-axis as an optical axis, when the axis obtained by inclining the z-axis by a rotation angle φ (preferably $-5° \leq \varphi \leq 15°$) with the x-axis as the rotation axis so that the +z side rotates in the −y direction of the y-axis is set as the z'-axis and the axis obtained by inclining the y-axis by the rotation angle φ with the x-axis as the rotation axis so that the +y side rotates in the +z direction of the z-axis is set as the y'-axis, a so-called quartz crystal z-plate (z'-plate) which is cut along a plane defined by the x-axis and the y'-axis and processed into a flat plate shape and has a predetermined thickness t in the z'-axis direction orthogonal to the plane is used as a base material will be described. The z'-axis is an axis along the direction in which gravity acts in the acceleration sensors 118 x, 118 y, and 118 z.

First, a configuration of a sensor element 200 for measuring acceleration will be described with reference to FIG.

18. The sensor element 200 includes a substrate structure 201 including a base portion 210 and the like, an acceleration measurement element 270 coupled to the substrate structure 201 and measuring the physical quantity, and mass portions 280 and 282.

The substrate structure 201 of the sensor element 200 includes the base portion 210, a movable portion 214 connected to the base portion 210 through a joint portion 212, and a connection portion 240, and a first support portion 220, a second support portion 230, a third support portion 250, and a fourth support portion 260 that are provided to be connected to the base portion 210. Here, the third support portion 250 and the fourth support portion 260 are connected at the side where the connection portion 240 is disposed.

As the substrate structure 201, a quartz crystal substrate of the quartz crystal z-plate (z'-plate) cut out at a predetermined angle from a quartz crystal rough stone or the like which is a piezoelectric material is used. By patterning the quartz crystal substrate, the support portions are integrally formed as a substrate structure 201. For patterning, for example, a photolithography technique and a wet etching technique can be used.

The base portion 210 is coupled to the movable portion 214 through the joint portion 212, and supports the movable portion 214. The base portion 210 is coupled to the movable portion 214 through the joint portion 212, the connection portion 240 positioned on a side opposite to the side, where the joint portion 212 is positioned, of the movable portion, the first support portion 220 and the second support portion 230, and the third support portion 250 and the fourth support portion 260 connected to each other at the connection portion 240 side.

The joint portion 212 is provided between the base portion 210 and the movable portion 214, and is coupled to the base portion 210 and the movable portion 214. The thickness (length in the z'-axis direction) of the joint portion 212 is thin (short) as compared with the thickness of the base portion 210 and the thickness of the movable portion 214, and the joint portion 212 is formed in a constricted shape in a cross-sectional view from the x-axis direction. The joint portion 212 is formed, for example, as a thin-walled portion having a small thickness by performing so-called half etching on the substrate structure 201 including the joint portion 212. The joint portion 212 has a function as a rotation axis along the x-axis direction as a fulcrum (intermediate hinge) when the movable portion 214 is displaced (rotates) with respect to the base portion 210.

The movable portion 214 is coupled to the base portion 210 through the joint portion 212. The movable portion 214 has a plate shape, and has principal surfaces 214a and 214b facing each other along the z'-axis direction and having the front and back relationship. The movable portion 214 is displaced in a direction (z'-axis direction) intersecting the principal surfaces 214a and 214b with the joint portion 212 as a fulcrum (rotation axis), according to acceleration which is a physical quantity applied in the direction (z'-axis direction) intersecting the principal surfaces 214a and 214b.

The connection portion 240 extends from the base portion 210 on the +x direction side provided with the third support portion 250 described later along the x-axis direction so as to surround the movable portion 214, and is provided to be coupled to the base portion 210 on the −x direction side where the fourth support portion 260 described later is provided.

The first support portion 220 and the second support portion 230 are provided symmetrically with respect to the acceleration measurement element 270. The third support portion 250 and the fourth support portion 260 are provided symmetrically with respect to the acceleration measurement element 270. In the first support portion 220, the second support portion 230, the third support portion 250 and the fourth support portion 260, the substrate structure 201 is supported by a fixed portion.

The acceleration measurement element 270 is coupled to the base portion 210 and the movable portion 214. In other words, the acceleration measurement element 270 is provided so as to straddle the base portion 210 and the movable portion 214. The acceleration measurement element 270 includes vibrating beam portions 271a and 271b as a vibrating portion, a first base portion 272a, and a second base portion 272b. In the acceleration measurement element 270 in which the first base portion 272a and the second base portion 272b are coupled to the base portion 210, for example, the movable portion 214 is displaced according to the physical quantity so that stress is generated in the vibrating beam portions 271a and 271b and physical quantity detection information generated in the vibrating beam portions 271a and 271b changes. In other words, the vibration frequency (resonance frequency) of the vibrating beam portions 271a and 271b changes. The acceleration measurement element 270 in this embodiment is a double-ended tuning fork element (double-ended tuning fork type vibration element) having two vibrating beam portions 271a and 271b, the first base portion 272a, and the second base portion 272b. Here, the vibrating beam portions 271a and 271b as the vibrating portion may be referred to as a vibrating arm, a vibrating beam, a columnar beam, or the like in some cases.

As the acceleration measurement element 270, a quartz crystal substrate of a quartz crystal z-plate (z'-plate) cut out at a predetermined angle described above, similarly to the substrate structure 201, from a quartz crystal rough stone or the like which is a piezoelectric material is used. The acceleration measurement element 270 is formed by patterning the quartz crystal substrate by a photolithography technique and an etching technique. With this configuration, the vibrating beam portions 271a and 271b, the first base portion 272a, and the second base portion 272b can be integrally formed.

The material of the acceleration measurement element 270 is not limited to the quartz crystal substrate described above. As the material of the acceleration measurement element 270, for example, a semiconductor material such as, a piezoelectric material such as lithium tantalate ($LiTaO_3$), lithium tetraborate ($Li_2B_4O_7$), lithium niobate ($LiNbO_3$), lead zirconate titanate (PZT), zinc oxide (ZnO), aluminum nitride (AlN), or silicon having a piezoelectric material (piezoelectric material) film such as zinc oxide (ZnO), aluminum nitride (AlN), or the like can be used. In this case, it is preferable that similar materials are used for the substrate structure 201 and the acceleration measurement element 270.

Although illustration and explanation are omitted, an extraction electrode and an excitation electrode may be provided in the acceleration measurement element 270.

The mass portions 280 and 282 are provided on the principal surface 214a of the movable portion 214 and the principal surface 214b serving as the back surface in a front and back relationship between the principal surfaces 214a and 214b. Specifically, the mass portions 280 and 282 are provided on the principal surface 214a and the principal surface 214b through a mass bonding material (not illustrated). Examples of the material of the mass portions 280 and 282 include metals such as copper (Cu) and gold (Au). The mass portions 280 and 282 function as the cantilever.

In this embodiment, the acceleration measurement element 270 is configured by a double-ended tuning fork oscillator (double-ended tuning fork type vibrating element) in which the vibrating portion is configured by two columnar beams of the vibrating beam portions 271a and 271b, but this acceleration measurement element 270 can also be configured by one columnar beam (single beam).

Next, a configuration of an acceleration detector 300 using the sensor element 200 for measuring acceleration will be described with reference to FIG. 19.

Figure 19:
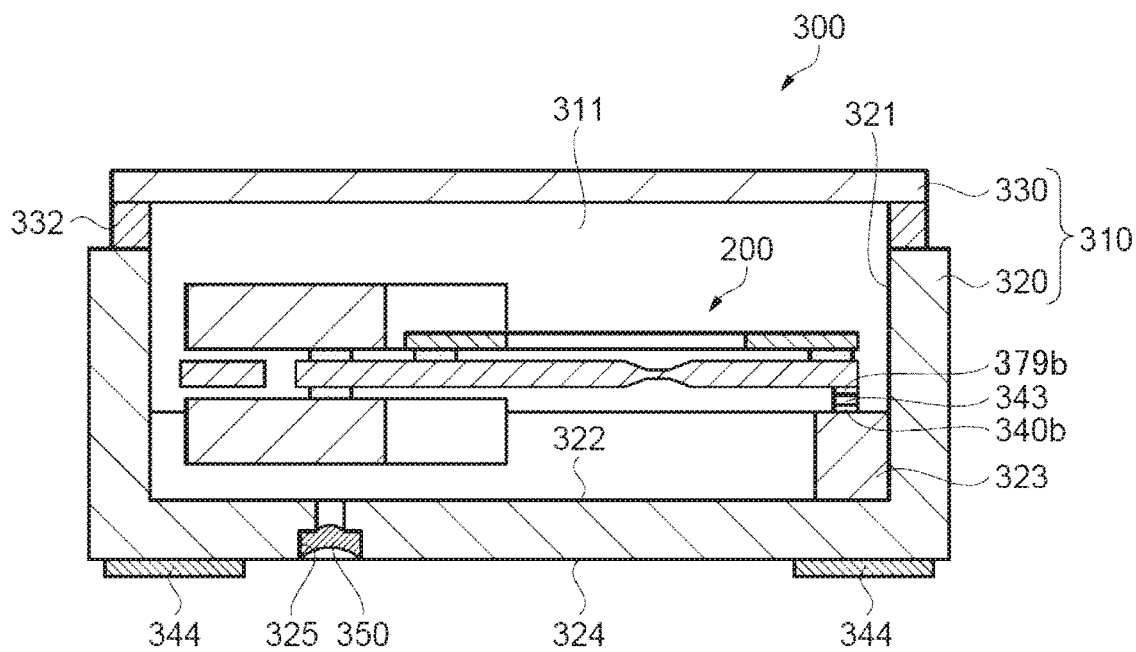
FIG. 19 is a cross-sectional view illustrating a schematic configuration of an acceleration detector.

As illustrated in FIG. 19, the sensor element 200 described above is mounted on the acceleration detector 300. The acceleration detector 300 includes the sensor element 200 and a package 310. The package 310 includes a package base 320 and a lid 330. Then, the sensor element 200 is accommodated in the package 310 of the acceleration detector 300. Specifically, the sensor element 200 is accommodated in a space 311 provided by coupling the package base 320 and the lid 330.

The package base 320 has a recess 321, and the sensor element 200 is provided in the recess 321. The shape of the package base 320 is not particularly limited as long as it can accommodate the sensor element 200 in the recess 321. As the package base 320 in this embodiment, for example, a material such as ceramics, quartz crystal, glass, silicon, or the like can be used.

The package base 320 has a step portion 323 protruding toward the lid 330 from an inner bottom surface 322 which is the bottom surface inside the recess of the package base 320. The step portion 323 is provided along the inner wall of the recess 321, for example. The step portion 323 is provided with a plurality of internal terminals 340b.

Each of the internal terminal 340b is provided so as to face a position overlapping with a fixing-portion connection terminal 379b, which is provided on each of the fixing portions of the first support portion 220, the second support portion 230, the third support portion 250, and the fourth support portion 260 of the sensor element 200, in a plan view. Each of the internal terminal 340b is electrically connected to the fixing-portion connection terminal 379b using a silicone resin-based conductive adhesive 343 containing a conductive material such as a metal filler, for example. As such, the sensor element 200 is mounted on the package base 320 and accommodated in the package 310.

In the package base 320, on an outer bottom surface 324 which is an opposite surface to the inner bottom surface 322, external terminals 344 used when being mounted on an external member are provided. Each of the external terminals 344 is electrically coupled to each of the internal terminal 340b through an internal wiring (not illustrated).

The internal terminal 340b and the external terminal 344 are formed of a metal film obtained by laminating a film of nickel (Ni), gold (Au), or the like on a metallized layer of tungsten (W) or the like by plating or the like.

The package base 320 is provided with a sealing portion 350 for sealing the inside of the package 310 at the bottom portion of the recess 321. The sealing portion 350 is provided in a through-hole 325 formed in the package base 320. The through-hole 325 penetrates from the outer bottom surface 324 to the inner bottom surface 322. In the example illustrated in FIG. 19, the through-hole 325 has a stepped shape in which a hole diameter on the outer bottom surface 324 side is larger than the hole diameter on the inner bottom surface 322 side. The sealing portion 350 is formed by disposing a sealing material made of, for example, gold (Au) and germanium (Ge) alloy, solder, and the like in the through-hole 325, heating and melting the sealing material, and solidifying the sealing material. The sealing portion 350 is provided to hermetically seal the inside of the package 310.

The lid 330 is provided so as to cover the recess 321 of the package base 320. The shape of the lid 330 is, for example, a plate shape. As the lid 330, for example, the same material as the package base 320, an alloy of iron (Fe) and nickel (Ni), a metal such as stainless steel or the like can be used. The lid 330 is joined to the package base 320 through a lid joining member 332. As the lid joining member 332, for example, a seam ring, a low melting point glass, an inorganic adhesive or the like can be used.

The inside of the package 310 can be hermetically sealed by providing the sealing portion 350 by disposing the sealing material in the through-hole 325, heating and melting the sealing material, and solidifying the sealing material in a state where the inside of the package 310 is depressurized (in a state of high degree of vacuum) after the lid 330 is joined to the package base 320. The inside of the package 310 may be filled with an inert gas such as nitrogen, helium, argon or the like.

In the acceleration detector 300, when a drive signal is given to the excitation electrode of the sensor element 200 through the external terminal 344, the internal terminal 340b, the fixing-portion connection terminal 379b, and the like, the vibrating beam portions 271a and 271b of the sensor element 200 vibrate at a predetermined frequency. Then, the acceleration detector 300 outputs the resonance frequency of the sensor element 200, which changes according to the applied acceleration, as an output signal. The acceleration detector 300 can be used as the acceleration sensors 118x, 118y, and 118z of the physical quantity sensor module 100 described above, and each of the acceleration sensors 118x, 118y, and 118z outputs a measured signal X having a frequency corresponding to applied acceleration.

An experiment result illustrating the effect of reducing the VRE component when the sensor output detection circuit 1 including the VRE correction circuit 3 is applied to the physical quantity sensor module 100 configured as described above is illustrated in FIG. 20.

Figure 20:
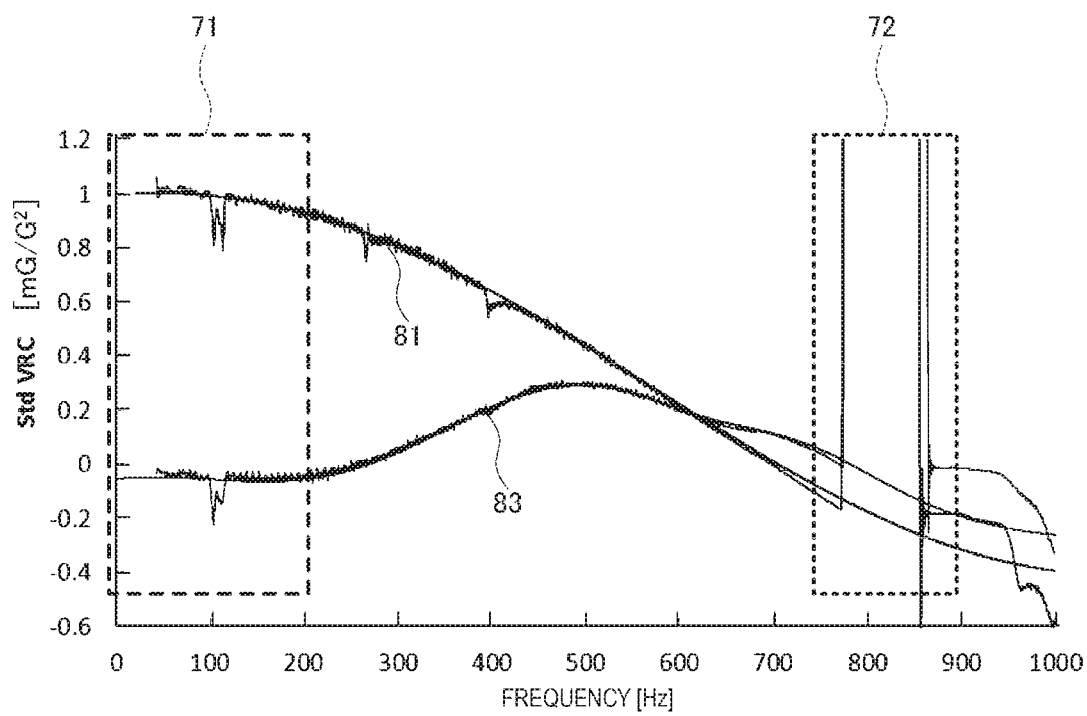
FIG. 20 is a graph illustrating a change in VRC before and after execution of VRE correction.

FIG. 20 is a graph illustrating a change in the VRC before and after VRE correction by the sensor output detection circuit 1 is performed. The horizontal axis of FIG. 20 represents a frequency of a sine wave signal input to the sensor element, and the vertical axis of FIG. 20 represents the VRC. In FIG. 20, a correction frequency band 71 by the low frequency band correction circuit 30 and a correction frequency band 72 by the high frequency band correction circuit 40 are illustrated.

The correction frequency band 71 by the low frequency band correction circuit 30 is a measurement frequency band of the physical quantity sensor module 100, and in the experiment of FIG. 20, the correction frequency band 71 was set from 0 Hz to 200 Hz. The correction frequency band 72 by the high frequency band correction circuit 40 is set from 750 Hz to 900 Hz in the experiment result of FIG. 20. In the sensor element 200 of the physical quantity sensor module 100 illustrated in FIGS. 16 to 20, resonance vibration occurs at a frequency of approximately 820 Hz in accordance with the lengths of the vibrating beam portions 271a and 271b and the mass portions 280 and 282. Then, at the resonance frequency at which the resonance vibration occurs, the VRC remarkably increases. Accordingly, by setting the correction frequency band 72 of the high frequency band correction circuit 40 from 750 Hz to 900 Hz, the influence of the resonance vibration occurring in the sensor element for the measurement frequency band of the physical quantity sensor module 100 is reduced.

In FIG. 20, a VRC level 81 when the VRE is not corrected and a VRC level 83 when the VRE is corrected are illustrated as the experiment result. By correcting the VRE by the VRE correction circuit 3 including the low frequency band correction circuit 30 and the high frequency band correction circuit 40 having the correction frequency in the frequency bands described above, as illustrated in FIG. 20, the VRC from 0 Hz to 200 Hz which is the measurement frequency band of the physical quantity sensor module 100 is reduced, so that the VRE occurring in the physical quantity sensor module 100 is reduced.

2.2 Application to Other Physical Quantity Sensor Modules.

In the matters as described above, the physical quantity sensor module 100 provided with the acceleration detector 300 for measuring acceleration as the sensor element for measuring the physical quantity is described by way of example, but a physical quantity sensor module including a sensor element that measures at least one of mass, angular velocity, angular acceleration, electrostatic capacitance, and temperature as a physical quantity may be adopted as a sensor element for measuring the physical quantity.

A quartz crystal microbalance (QCM) is known as a method of measuring a minute mass change in a mass sensor that measures mass as a physical quantity. In such a mass sensor, the matters that the oscillation frequency of the crystal oscillator decreases as an amount of substances attached to the quartz crystal oscillator electrode surface increases, and the oscillation frequency increases as the attached substance amount decreases are utilized. Measurement sensitivity of the mass sensor as described above can be calculated by Sauerbrey's equation. For example, in the case of an AT-cut quartz crystal resonator having a fundamental frequency of 27 MHz, a decrease in the frequency of 1 Hz corresponds to a mass increase of 0.62 ng/cm$^2$ on the electrode surface.

In a case where an object spinning at constant angular velocity $\omega$ is observed from an observation point spinning at angular velocity $\Omega$, an angular velocity sensor measuring the angular velocity or angular acceleration as a physical quantity measures the angular velocity using the matters that the angular velocity of the object appears as "$\omega$-$\Omega$". In such an angular velocity sensor, matters that an appearing resonance frequency observed from the electrode changes when a sensor element receives angular acceleration in a state where a wave having a natural frequency is circulated by electrostatically driving disc-shaped mass using an electrode are utilized. In the angular velocity sensor as described above, there is no limitation on a bandwidth in principle, and for example, accuracy improvement of technology related to frequency measurement and nonlinearity correction directly leads to higher sensitivity of the measurement sensitivity.

In an electrostatic capacitance sensor that measures electrostatic capacitance as the physical quantity, it is possible to measure capacitance to be measured by causing RC oscillation to occur using a reference resistance and capacitance to be measured and measuring an oscillation frequency. Then, the matters that the time constant given by the RC changes and the oscillation frequency shifts when the capacitance to be measured changes are utilized. In the electrostatic capacitance sensor, various error factors can be eliminated in such a way that reference electrostatic capacitance is prepared separately from the capacitance to be measured, the RC oscillation is caused by using the reference resistance and the reference electrostatic capacitance, and this RC oscillation is set as a reference oscillation frequency to thereby set a mechanism for detecting the difference between the reference oscillation frequency and the previous oscillation frequency.

In a temperature sensor that measures temperature as a physical quantity, temperature measurement can be performed by causing RC oscillation to occur using a thermistor and a reference electrostatic capacitance and measuring the oscillation frequency. Then, the matters that the time constant given by the RC changes and the oscillation frequency shifts when a resistance value of a thermistor varies with temperature are utilized. In the temperature sensor, various error factors can be eliminated in such away that a reference resistance is prepared separately from the thermistor, the RC oscillation is caused by using the reference resistance and the reference electrostatic capacitance, and this RC oscillation is set as a reference oscillation frequency to thereby set a mechanism for detecting the difference between the reference oscillation frequency and the previous oscillation frequency.

Even in the physical quantity sensor module 100 including the sensor elements for measuring various physical quantities as described above, the sensor output detection circuit 1 including the VRE correction circuit 3 is applied so as to make it possible to reduce the VRE and to reduce the computation load in the VRE correction.

3. Structure Monitoring Device (SHM: Structural Health Monitoring)

Figure 21:
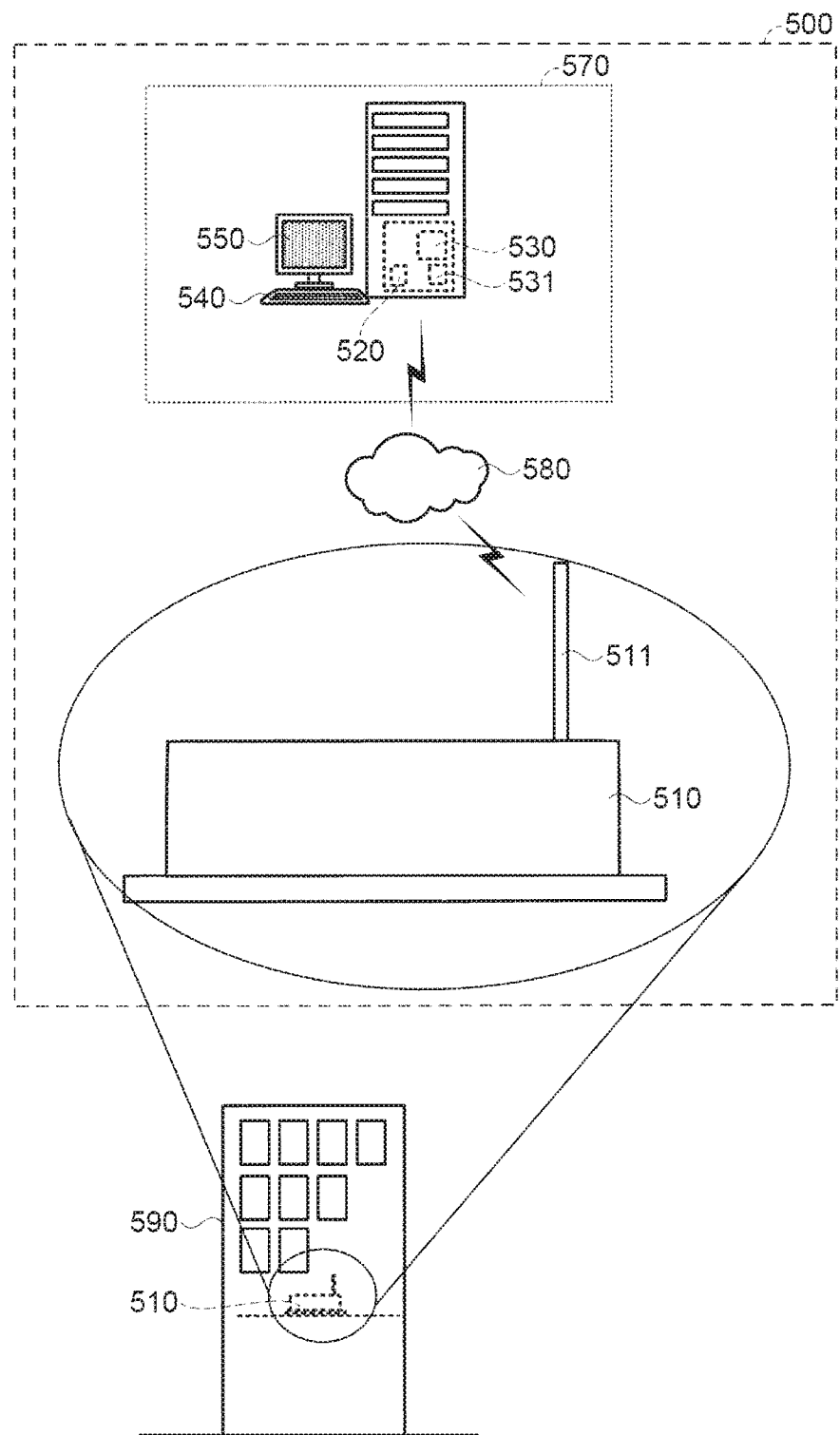
FIG. 21 is a configuration diagram of a structure monitoring device.

FIG. 21 is a configuration diagram of a structure monitoring device according to the embodiment. As illustrated in FIG. 21, a structure monitoring device 500 according to this embodiment includes a physical quantity sensor module 510 having the same function as the physical quantity sensor module 100 of the embodiment described and attached to a structure 590 to be monitored. The physical quantity sensor module 510 includes a transmitter 511 that transmits a measurement signal. The transmitter 511 may be realized as a communication module and an antenna separate from the physical quantity sensor module 510.

The physical quantity sensor module 510 is coupled to a monitoring computer 570, for example, through a wireless or wired communication network 580. The monitoring computer 570 includes a receiver 520 coupled to the physical quantity sensor module 510 through the communication network 580 and a calculator 530 for calculating an inclination angle of the structure 590 based on a reception signal output from the receiver 520.

In this embodiment, the calculator 530 is realized by an application specific integrated circuit (ASIC), a field programmable gate array (FPGA) or the like mounted on the monitoring computer 570. However, a configuration in which the calculator 530 is realized by software by performing computation processing on a program stored in an IC memory 531 by a processor such as a central processing unit (CPU) may be adopted. The monitoring computer 570 can receive various operation inputs of the operator through a keyboard 540 and display the result of operation processing on a touch panel 550.

According to the structure monitoring device 500 of this embodiment, inclination of the structure 590 is monitored by utilizing the physical quantity sensor module 510 having the same function as the physical quantity sensor module 100 of the embodiment described above. Therefore, it is possible to reduce the VRE which is the operation effect of the physical quantity sensor module 100 and to reduce the computation load in the VRE correction, and it is possible to utilize detection of high accurate physical quantity (acceleration, angular velocity, and the like). It is possible to accurately measure the inclination of the structure 590 to be monitored, and it is possible to improve monitoring quality of the structure 590.

Although the embodiments and modification example have been described as above, the present disclosure is not limited to these embodiments and can be implemented in various aspects without departing from the gist thereof. For example, the embodiments described above can be combined as appropriate.

The present disclosure includes a configuration (for example, a configuration having the same function, method and result, or a configuration having the same object and effect) which is substantially the same as the configuration described in the embodiments. The present disclosure includes a configuration in which non-essential parts of the configuration described in the embodiment are replaced. Further, the present disclosure includes a configuration that achieves the same operation and effect as the configuration described in the embodiment, or a configuration that can achieve the same object. The present disclosure includes a configuration in which a publicly-known technique is added to the configuration described in the embodiment.

What is claimed is:

1. A vibration rectification error correction circuit comprising:
    a frequency delta sigma modulation circuit, the frequency delta sigma modulation circuit being configured to:
    receive a reference clock signal;
    receive an original sensor signal from a sensor element, the sensor element being configured to measure a physical quantity corresponding to the original sensor signal; and
    generate a modulated sensor signal based on the reference clock signal and the original sensor signal, a digital value of the modulated sensor signal corresponding to a number of signal edges of the reference clock signal in a most recent one cycle of the original sensor signal, and
    a first connection circuit, the first correction circuit being configured to:
    receive the modulated sensor signal having the digital value;
    obtain a plurality of correction values, the plurality of correction values being set based on a property of the sensor element, the plurality of correction values being used for calculating a correction of a vibration rectification error of the original sensor signal;
    subtract each value of the plurality of correction values from the digital value so as to obtain a plurality of subtracted values; and
    multiply each value of the plurality of subtracted values so as to obtain a product as a corrected sensor signal in which the vibration rectification error of the original sensor signal has been corrected.

2. The vibration rectification error correction circuit according to claim 1, wherein
    the vibration rectification error of the original sensor signal has been corrected by a correction function based on the product,
    the correction function is a quadratic function, and
    a quadratic coefficient of the quadratic function is 1.

3. The vibration rectification error correction circuit according to claim 1, further comprising:
    a second correction circuit that includes a first filter circuit and a second filter circuit, the second correction circuit being configured to correct the vibration rectification error based on a filter characteristic of the first filter circuit and a filter characteristic of the second filter circuit, wherein
    the frequency delta sigma modulation circuit is configured to generate the modulated sensor signal obtained by performing frequency delta sigma modulation on the reference clock signal and the original sensor signal,
    the first filter circuit is provided on an output side of the frequency delta sigma modulation circuit and is configured to operate in synchronization with the original sensor signal,
    the second filter circuit is provided on an output side of the first filter circuit and is configured to operate in synchronization with the reference clock signal, and
    a signal output from the second filter circuit is input to the first correction circuit.

4. A physical quantity sensor module comprising:
    the vibration rectification error correction circuit according to claim 1; and
    the sensor element.

5. A physical quantity sensor module comprising:
    the vibration rectification error correction circuit according to claim 3; and
    the sensor element.

6. The physical quantity sensor module according to claim 4, wherein
    the sensor element is configured to measure at least one of a mass, an acceleration, an angular velocity, an angular acceleration, an electrostatic capacitance, and a temperature as the physical quantity.

7. The physical quantity sensor module according to claim 5, wherein
    the sensor element is configured to measure at least one of a mass, an acceleration, an angular velocity, an angular acceleration, an electrostatic capacitance, and a temperature as the physical quantity.

8. A structure monitoring device comprising:
    the physical quantity sensor module according to claim 5;
    a receiver receiving a measurement signal from the physical quantity sensor module attached to a structure; and
    a calculator calculating an inclination angle of the structure based on a signal output from the receiver.

9. A correction value adjustment method of a vibration rectification error correction circuit, the correction value adjustment method comprising:
    receiving, by a frequency delta sigma modulation circuit, a reference clock signal;
    receiving, by the frequency delta sigma modulation circuit, an original sensor signal from a sensor element, the sensor element being configured to measure a physical quantity corresponding to the original sensor signal;
    generating, by the frequency delta sigma modulation circuit, a modulated sensor signal based on the reference clock signal and the original sensor signal, a first digital value of the modulated sensor signal corresponding to a number of signal edges of a reference clock signal in the most recent one cycle of the original sensor signal;
    receiving, by a second correction circuit, the modulated sensor signal having the first digital value, the reference clock signal, and the original sensor signal, wherein the second correction circuit includes a first filter circuit and a second filter circuit, the first filter circuit is provided on an output side of the frequency delta sigma modulation circuit and is configured to operate in synchronization with the original sensor signal, and the second filter circuit is provided on an output side of the first filter circuit and is configured to operate in synchronization with the reference clock signal;

correcting, by the second correction circuit, a first vibration rectification error of the original sensor signal based on the filter characteristic of the first filter circuit and a filter characteristic of the second filter circuit so as to output a filtered sensor signal having a second digital value;

receiving, by a first correction circuit, the filtered sensor signal having the second digital value;

obtaining, by the first correction circuit, a plurality of correction values, the plurality of correction values being set based on a property of the sensor element, the plurality of correction values being used for calculating a correction of a second vibration rectification error of the original sensor signal;

subtracting, by the first correction circuit, each value of the plurality of correction values from the second digital value as to obtain a plurality of subtracted values;

multiplying, by the first correction circuit, each value of the plurality of subtracted values so as to obtain a product as a corrected sensor signal in which the first and second vibration rectification errors of the original sensor signal have been corrected;

adjusting the plurality of correction values of the first correction circuit; and adjusting the filter characteristic of the first filter circuit and the filter characteristic of the second filter circuit of the second correction circuit, wherein the adjusting of the plurality of correction values is performed before the adjusting of the filter characteristics of the first and second filter circuits.

\* \* \* \* \*